(12) United States Patent
Stauffer et al.

(10) Patent No.: US 7,768,522 B2
(45) Date of Patent: Aug. 3, 2010

(54) VIRTUALIZATION OF GRAPHICS RESOURCES AND THREAD BLOCKING

(75) Inventors: John Stauffer, Morgan Hill, CA (US); Bob Beretta, Fair Oaks, CA (US)

(73) Assignee: Apple Inc., Cupertino, CA (US)

( * ) Notice: Subject to any disclaimer, the term of this patent is extended or adjusted under 35 U.S.C. 154(b) by 980 days.

(21) Appl. No.: 11/112,563

(22) Filed: Apr. 22, 2005

(65) Prior Publication Data

US 2005/0237330 A1  Oct. 27, 2005

Related U.S. Application Data

(60) Continuation-in-part of application No. 10/964,873, filed on Oct. 13, 2004, which is a division of application No. 10/042,882, filed on Jan. 8, 2002, now Pat. No. 6,809,735.

(51) Int. Cl.
  *G06F 12/10* (2006.01)
  *G06F 13/00* (2006.01)
  *G09G 5/36* (2006.01)
(52) U.S. Cl. .................. 345/568; 345/538; 345/547
(58) Field of Classification Search .................. 345/568, 345/530, 531, 536–538, 545, 547, 501
See application file for complete search history.

(56) References Cited

U.S. PATENT DOCUMENTS

| | | | | |
|---|---|---|---|---|
| 5,113,180 | A * | 5/1992 | Gupta et al. ................. | 345/542 |
| 5,471,672 | A * | 11/1995 | Reddy et al. ................. | 710/116 |
| 5,757,385 | A | 5/1998 | Narayanaswami et al. | |
| 5,802,590 | A | 9/1998 | Draves | |
| 5,832,289 | A | 11/1998 | Shaw et al. | |
| 5,842,015 | A | 11/1998 | Cunniff et al. | |
| 6,005,851 | A | 12/1999 | Craddock et al. | |
| 6,075,546 | A * | 6/2000 | Hussain et al. ................. | 345/522 |
| 6,170,047 | B1 | 1/2001 | Dye | |
| 6,181,346 | B1 | 1/2001 | Ono et al. | |
| 6,188,381 | B1 | 2/2001 | van der Wal et al. | |
| 6,232,990 | B1 * | 5/2001 | Poirion ................. | 345/519 |
| 6,269,102 | B1 * | 7/2001 | Hayashi ................. | 370/428 |
| 6,397,263 | B1 | 5/2002 | Hancock et al. | |
| 6,408,386 | B1 | 6/2002 | Hammond et al. | |
| 6,437,788 | B1 | 8/2002 | Milot et al. | |

(Continued)

OTHER PUBLICATIONS

Intel Corporation. "AGP Accelerated Graphics Port: Accelerated Graphics Port Interface Specification," Revision 2.0 (May 4, 1998), cover sheet, p. 2 and pp. 23-29.

(Continued)

*Primary Examiner*—Joni Hsu
(74) *Attorney, Agent, or Firm*—Blakely, Sokoloff, Taylor & Zafman LLP

(57) ABSTRACT

Virtualization of graphics resources and thread blocking is disclosed. In one exemplary embodiment, a system and method of a kernel in an operating system including generating a data structure having an identifier of a graphics resource assigned to a physical memory location in video memory, and blocking access to the physical memory location if a data within the physical memory location is in transition between video memory and system memory wherein a client application accesses memory in the system memory directly and accesses memory in the video memory through a virtual memory map.

14 Claims, 17 Drawing Sheets

U.S. PATENT DOCUMENTS

| | | |
|---|---|---|
| 6,467,075 B1 | 10/2002 | Sato et al. |
| 6,633,564 B1 | 10/2003 | Steer et al. |
| 6,658,564 B1 | 12/2003 | Smith et al. |
| 6,697,076 B1 * | 2/2004 | Trivedi et al. ............... 345/568 |
| 6,724,767 B1 | 4/2004 | Chong et al. |
| 6,867,781 B1 | 3/2005 | Van Hook et al. |
| 7,136,068 B1 | 11/2006 | Priem et al. |
| 2002/0032850 A1 | 3/2002 | Kauffman |
| 2002/0052914 A1 | 5/2002 | Zalewski et al. |
| 2002/0101427 A1 | 8/2002 | Nguyen et al. |
| 2002/0152331 A1 | 10/2002 | Wong et al. |
| 2003/0001840 A1 | 1/2003 | Spitzer et al. |
| 2003/0115476 A1 | 6/2003 | McKee |
| 2003/0131147 A1 | 7/2003 | Wilt et al. |
| 2003/0140179 A1 | 7/2003 | Wilt et al. |
| 2004/0160449 A1 * | 8/2004 | Gossalia et al. ............. 345/543 |

OTHER PUBLICATIONS

Intel Corporation. "AGP Accelerated Graphics Port: Draft AGP V3.0 Interface Specification," Revision: 0.95 (May 2001), cover sheet and pp. 33-36.

Owens, John D. et al. "Polygon Rendering on a Stream Architecture," SIGGRAPH/EUROGRAPHICS Workshop on Graphics Hardware, ACM Press, NY, NY (Aug. 2000), pp. 23-32.

Segal, Mark et al. "The Design of the OpenGL Graphics Interface," Silicon Graphics Computer Systems (1994), pp. 1-10.

Silicon Graphics Computer Systems. "Open GL: The Industry's Foundation for High Performance Graphics," Datasheet (1998), 4 pages.

* cited by examiner

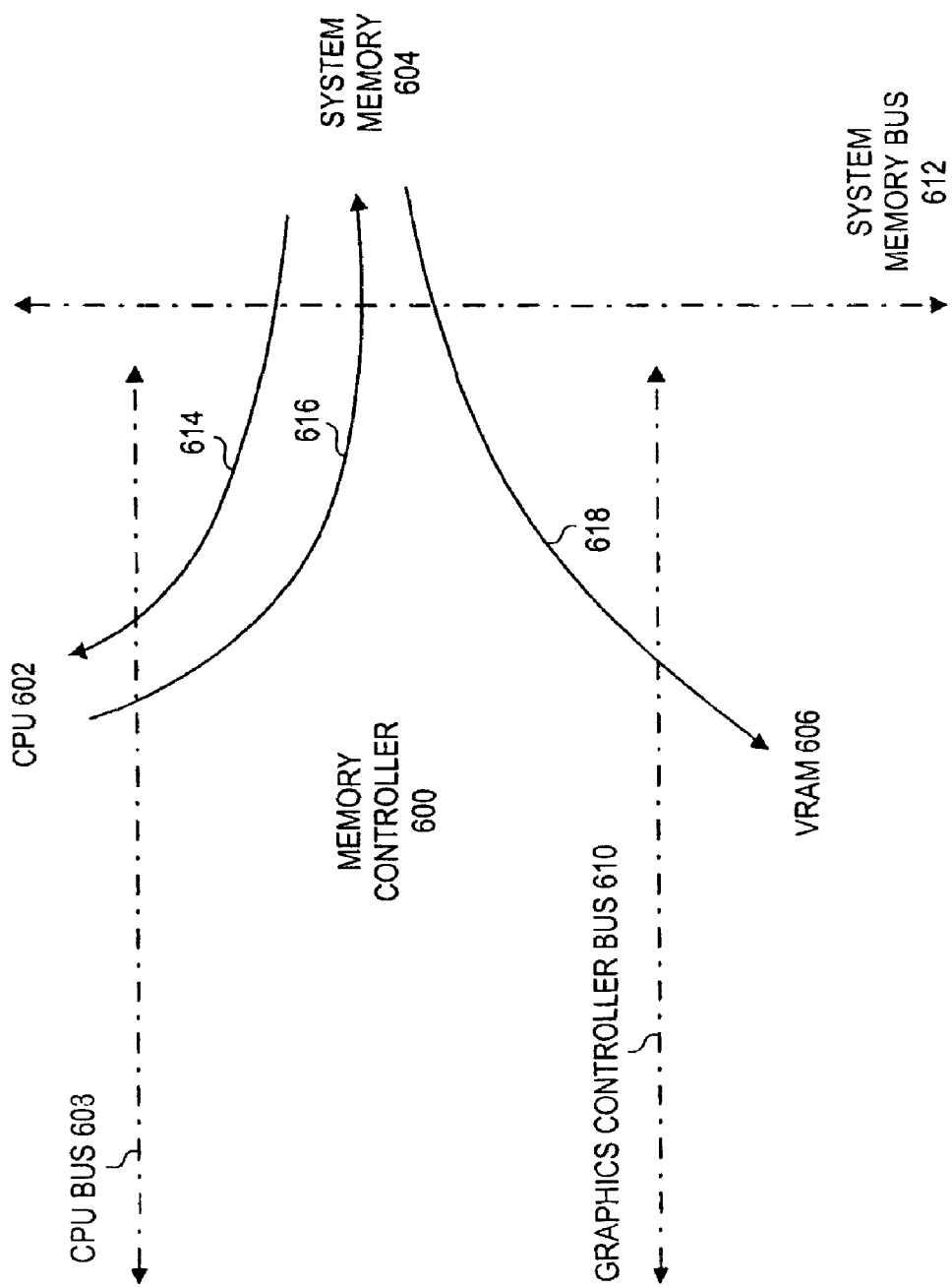

VIRTUALIZATION OF GRAPHICS RESOURCES AND THREAD BLOCKING

RELATED APPLICATIONS

The present application is a continuation-in-part of U.S. patent application Ser. No. 10/964,873, filed on Oct. 13, 2004, which is a divisional of U.S. patent application Ser. No. 10/042,882, filed on Jan. 8, 2002, which issued on Oct. 26, 2004 as U.S. Pat. No. 6,809,735.

FIELD OF THE INVENTION

This invention relates generally to computer graphics, and more particularly to virtualizing resources for computer graphics.

BACKGROUND OF THE INVENTION

A graphics kernel driver typically interfaces between graphics client drivers and graphics hardware to assign graphics resources to each client driver and to administer the submission of graphics commands to the graphics hardware. Each client driver has explicit knowledge of the graphics resources it is assigned and references the resources in its commands using the physical address of the resources. As more sophisticated graphics features are developed, the demand for graphics resources is ever increasing but the graphics resources are limited by the graphics hardware and other system constraints, such as performance of a system bus and a graphics controller bus. The assigned resources cannot be shared among clients because the graphics hardware is not designed to handle resource contention among the clients. Additionally, multiple operations across the system bus of a computer may hamper the performance of video memory causing performance bottlenecks within a computing environment.

SUMMARY OF THE DESCRIPTION

Graphics resources are virtualized through an interaction between graphics hardware and graphics clients. The interaction allocates the graphics resources across multiple graphics clients, processes commands for access to the graphics resources from the graphics clients, and it detects and resolves conflicts for the graphics resources among the clients.

In one aspect, the interaction in one exemplary embodiment includes an interface which is a virtualization module within a graphics kernel that assigns an identifier to a resource when allocated by a graphics client and the client uses the identifier instead of an address for the resource when requesting access to the resource.

In one aspect, a method of a kernel in an operating system generates a data structure having an identifier of a graphics resource assigned to a physical memory location in video memory and blocks access to the physical memory location if a data within the physical memory location is in transition between video memory and system memory wherein a client application accesses memory in the system memory directly and accesses memory in the video memory through a virtual memory map.

In another aspect, a system and method requests to write data to a video memory by using a virtual address of a portion of the video memory, translates the virtual address to a real physical address of the portion of the video memory; and writes data directly from a processor, through a memory controller, to the portion of the video memory without writing the data to a system memory. In one aspect, the translation is performed using a virtual memory map. In another aspect, the translation permits an access (e.g., read, write or both) between a client application and the video memory.

In one aspect, a graphics controller includes a video memory to write a resource to a physical memory location of the video memory; and a graphics microprocessor is connected to the video memory to receive the resource from a client application of a computing device, based on a translation of a virtual address of a portion of the video memory to the physical memory location.

In a further aspect, a system includes a virtualization module to assign identifiers associated with a set of resources to physical memory locations, and to optimize operations of a computing environment using: a fast-write interface to extract a first resource (e.g., a graphics resource) from a system memory through a single operation, and to transmit the first resource to a video memory. In this aspect, a command buffer interface may assemble at least a second resource (e.g., another graphics resource) from the system memory into at least one buffer, and to transmit at least the second resource to the video memory using the at least one buffer.

Because the native command structure for the graphics hardware is unaffected by the virtualization, neither the applications nor the hardware require modification to operate in conjunction with the present invention. Furthermore, because the virtualized resources appear as unlimited resources to the graphics clients, the clients can be simplified since, for example, they are no longer required to de-fragment or compact their assigned resources.

The present invention describes systems, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present embodiments are illustrated by way of example and not limitation in the figures of the accompanying drawings in which like references indicate similar elements, and in which:

FIG. 6B is a hardware interaction diagram for command buffer writes according to one embodiment.

DETAILED DESCRIPTION OF THE INVENTION

Figure 1A:
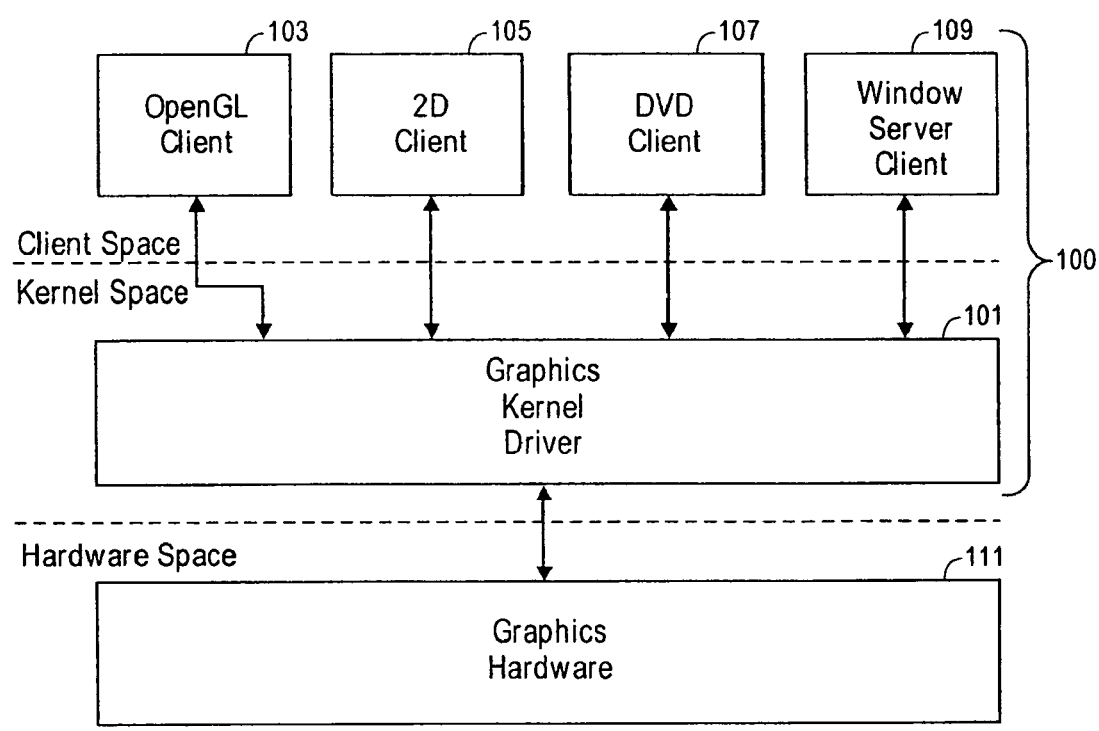
FIG. 1A is a diagram illustrating a graphics driver stack that incorporates the present invention.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

It is important to distinguish the concept of "video memory" from the different concept of "system memory." Specifically, "system memory" refers to the physical memory that connects to the computer system using a memory controller, through which CPU and other devices get access to it. In contrast, a "video memory" refers to the isolated physical memory that connects to the rest of computer system using a separate bus controller, typically embedded in graphics processor. "Video memory" caches source and result data as well as command data for graphics processor, and also provides data for refreshing the display device such as a Liquid Crystal Display (LCD) or CRT monitor.

For this reason, most video memory may be dual ported and faster than system memory. Video memory, such as video random access memory (VRAM), is often optimized for the use by a graphics processor. The video memory and the graphics processor and other devices that use video memory as the main storage forms a graphics subsystem that connects to the rest of computer system through a bus, such as PCI bus, AGP bus or PCI Express bus. Due to these differences, software typically treats "video memory" differently which can make software development more complicated due to the fact that you have to know if it is "video memory" or not.

In other words, video memory often needs to be faster than system memory (e.g., for this reason, most video memory may be dual-ported, which means that one set of data can be transferred between video memory and the video processor at the same time that another set of data is being transferred to the display device). There are many different types of video memory, including VRAM, WRAM, RDRAM, and SGRAM. While VRAM is used as an exemplary embodiment, other types of video memory may be used. In addition, video memory may require a separate memory controller than system memory. In the example shown in FIG. 6A, the system memory 604 may be controlled by memory controller 600, and the video memory may be controlled by graphics processor 607 (or another memory controller coupled to and controlled by the graphics processor 607). Video memory may have different physical blocks than system memory, and identifiers for these different physical blocks of memory may overlap the identifiers for the system memory. Furthermore, video memory may use a separate bus than system memory.

In contrast, system memory may refer to physical memory that is internal to the computer. A computer may be able to manipulate only data that is in system memory. Therefore, every program executed and every file accessed may be copied from a storage device into a system memory. However, system memory is different than video memory because system memory may be architecturally different and may not need to be optimized for video systems.

In one embodiment, the present invention is integrated into a graphics driver stack 100 as illustrated in FIG. 1A. A graphics kernel driver 101 interfaces between graphics client drivers 103, 105, 107, 109 and graphics hardware 111 to virtualize limited graphics resources used by the graphics hardware 111 and manage contention among the client drivers for the resources. The virtualized resources appear as unlimited resources to the client drivers, which allows the client drivers to be simplified since, for example, they are no longer required to de-fragment or compact their assigned memory.

Graphics resources eligible for virtualization include any limited resource used by the graphics hardware 111, such as graphics memory, either integrated in the graphics hardware 111 or allocated in system memory, GART (graphics address re-mapping table) entries, memory apertures for accessing video memory or registers, specialized memory areas for hierarchical depth buffers, among others. For the sake of clarity, the virtualization of graphics memory is used as an example throughout, but the invention is not so limited.

Figure 1B:
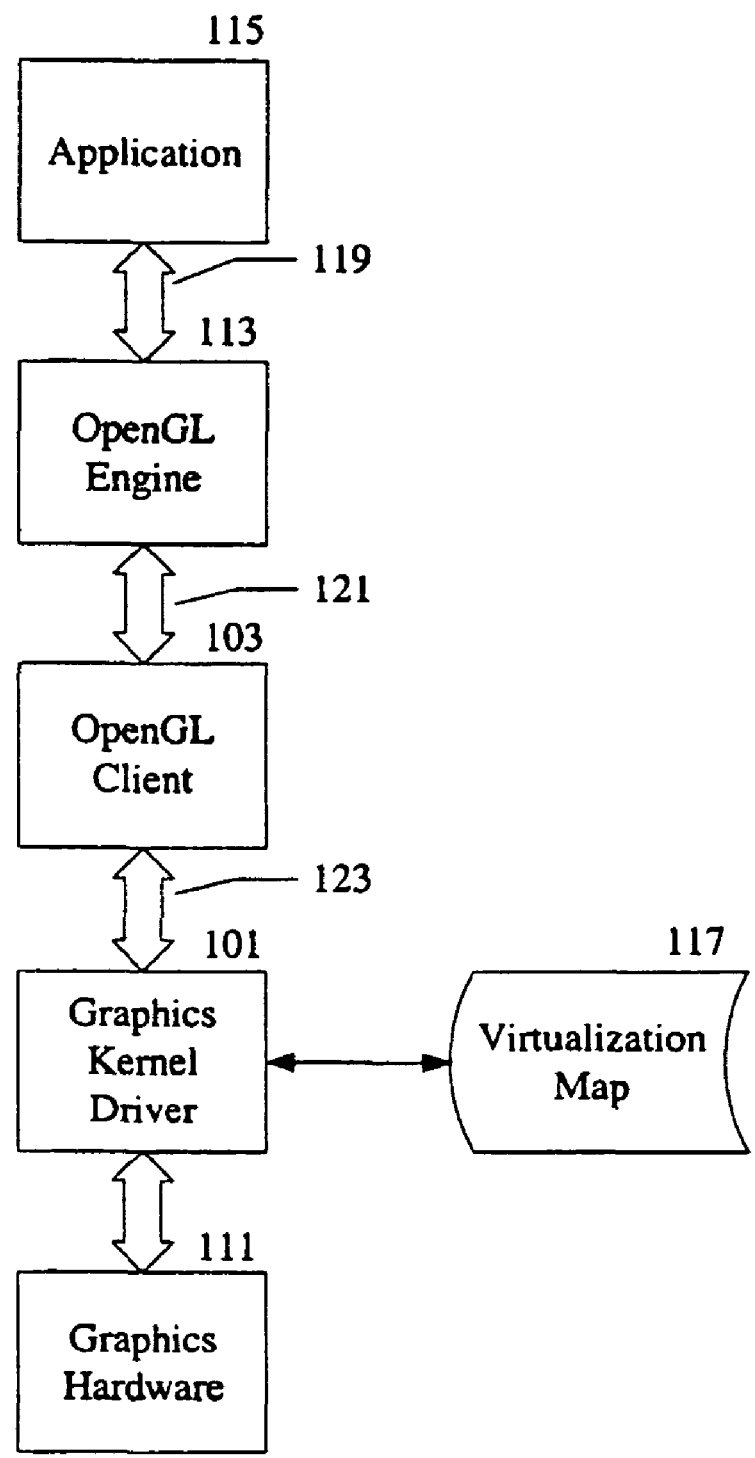
FIG. 1B is a diagram illustrating a system overview of one embodiment of processing in the driver stack of FIG. 1A.

Referring now to an exemplary embodiment shown in FIG. 1B, the kernel driver 101 manages the allocation of memory among clients (e.g., client drivers such as the OpenGL Client of FIG. 1) through a virtualization map 117, such as a range allocation table. It should be noted that the client drivers may be unaware of the physical memory location of a graphics resource. The virtualization map 117 indicates how graphics memory is currently allocated, including which block a client is using.

An application 115 calls an OpenGL engine 113 through an OpenGL API (application program interface) 119 to create an image. The OpenGL engine 113, executing on the central processing unit (CPU) of the computer, determines how to divide the image processing work between the CPU and the graphics processor of the graphics hardware 111, and sends the commands to be processed by the graphics processor to the OpenGL client driver through a client driver API 121. The client driver 103, also executing on the CPU, evaluates the commands and determines that it needs graphics memory to create the image. The client driver 103 requests a block of memory from the kernel driver 101 through a kernel driver API call 123. The kernel driver 101, executing on the graphics processor, records the request in an entry in the virtualization map 117, and associates an identifier with the entry. The kernel driver 101 returns the identifier to the client driver 103 for use in all commands that access the memory block. Because the native command structure for OpenGL and the graphics hardware is unaffected by the virtualization, neither the application 115, the OpenGL engine 113, nor the hardware 111 require modification to operate in conjunction with the present invention.

In one embodiment, the kernel driver 101 performs the actual physical allocation of memory upon the client driver 103 submitting a command that references the identifier. In another embodiment, the kernel driver 101 physically allocates the memory upon receiving the allocation request from client driver 103. In either case, when all physical memory is already allocated, the kernel driver 101 pages a corresponding amount of data currently in memory to a backing store and updates the virtualization map 117.

For example, with the virtualization of graphics resources, the kernel driver 101 will make decisions, based on the client driver's requirement, as to where to allocate a memory and where to page to. It could either be allocated in the system memory and/or allocated in video memory, and/or previously allocated in video memory and now allocated to system memory to allow the client driver to continue executing without any modification in the client driver. From the client driver's point of view, it gets a much larger and continuous view of resources while the kernel will take care of paging the necessary content in or out of the video memory if such underlining hardware resources are under pressure. Details of the paging are described further below in conjunction with FIG. 4B.

In one embodiment, the identifier is a "token" that represents the memory block and the client driver 103 creates tokenized commands by substituting the token for the memory address. When the client driver 103 submits a tokenized command to the graphics hardware 111, the kernel driver 101 extracts the token, finds the address of the memory block represented by the token in the virtualization map 117, and replaces the token with the real address. When the tokenized commands are submitted as part of a standard graphics command stream, the kernel driver 101 must parse the stream into its individual commands and evaluate most, if not all, the commands to determine which contain tokens. This can be a slow and expensive operation.

Figure 2A:
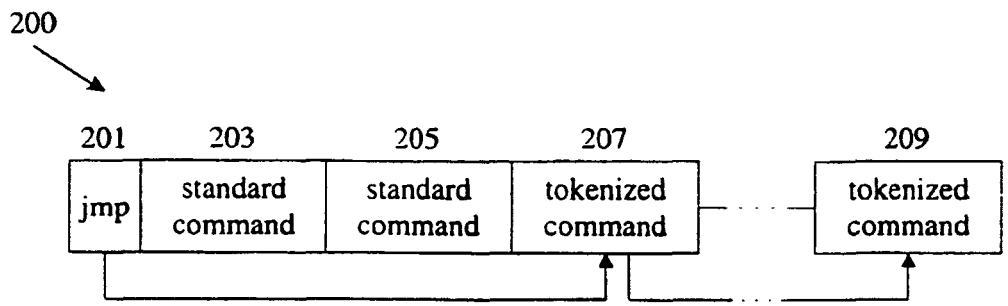
FIGS. 2A-B illustrate graphics command streams according to one embodiment of the invention.
Figure 2B:
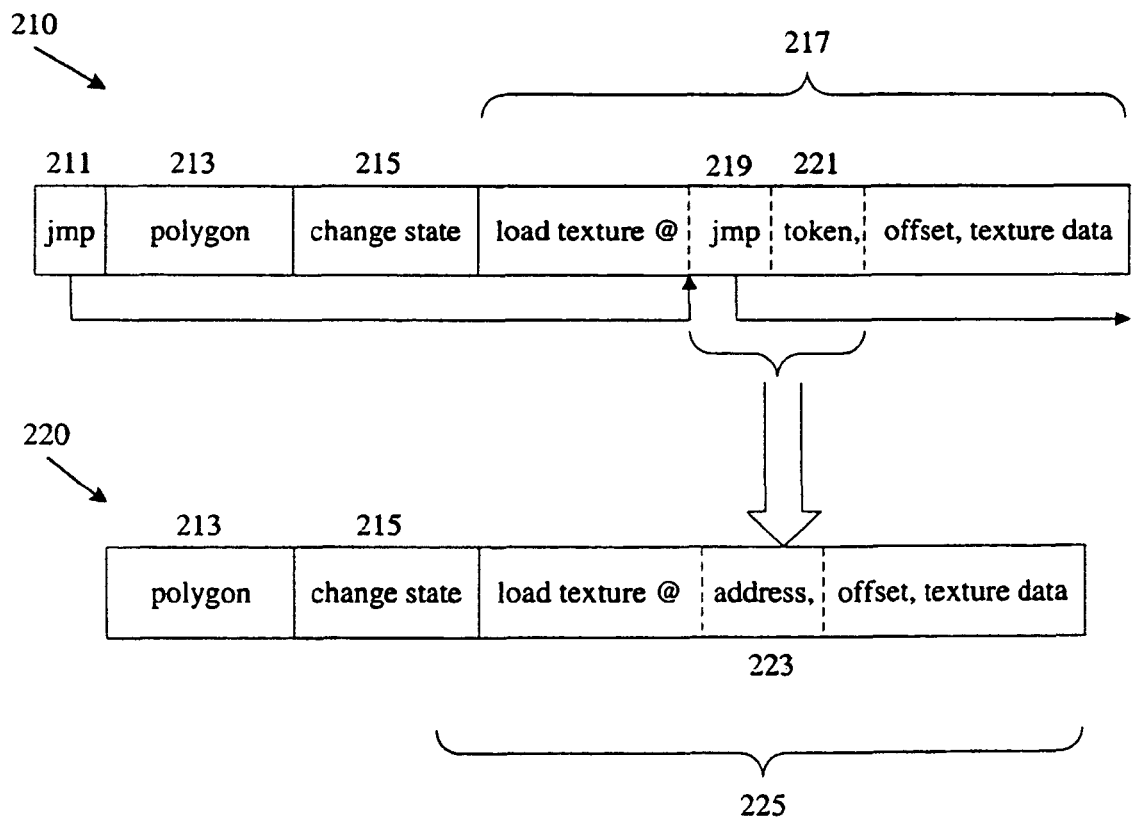

Therefore, in another embodiment, the client driver 103 formats the command stream as illustrated in FIG. 2B. A command stream 200 contains standard commands 203, 205, followed by a tokenized command 207, followed by various other commands, and terminates with a tokenized command 209. The stream 200 is prefaced with a "jump" packet 201 that points to the first tokenized command 207 in the stream 200. The tokenized command 207 contains another jump packet that points to the next tokenized command in the stream 200, and so on until the last jump packet in the stream is reached. The jump packets thus create a linked list of tokenized commands, allowing the kernel driver 101 to ignore the standard commands in the stream 200 without having to evaluate each command individually.

In one embodiment, the jump packets contain a packet type and an offset value relative to the current packet. Assuming a command stream 210 as illustrated in FIG. 2B, the kernel driver 101 reads the first command in the stream, which is a "start" jump packet 211. The kernel driver 101 extracts the offset value from the start jump packet 211 and deletes the packet from the stream. The kernel driver 101 uses the offset value to jump to the next jump packet 219, which is in the "load texture" command 217. The kernel driver 101 extracts the next offset value and packet type from the jump packet 219. The packet type identifies the packet 219 as a "texture" packet, indicating that the token 221 represents a block of memory containing texture data. The kernel driver 101 replaces the tokenized command 217 with a valid graphics command 225 containing the memory address 223 corresponding to the token 221, and jumps to the jump packet in the next tokenized command in the stream. The resulting stream 220 received by the graphics hardware 111 contains "polygon"213 and "change state"215 commands unchanged from the stream 210 submitted by the client driver 103, and a "load texture" command 225 as modified by the kernel driver 101. Thus, the final processing of the command stream by the kernel driver only requires each jump packet to be read and written to and from memory while the majority of the command data generated by the client driver is not read or interpreted by the kernel driver.

Alternate embodiments in which the jump packets are not embedded in the tokenized commands in the stream or are submitted as a separate stream associated with the command stream are contemplated as within the scope of the invention. For example, in certain such alternative embodiments, an implementation may use both embedded and non-embedded jump packets. In this implementation, the "polygon"213 and "change state"215 packets are embedded (e.g. as shown in FIG. 2B), but the "load texture"217 packet causes the execution path to jump out of the command stream 210 and jump into a separate "load texture" sub-stream that is stored out-of-line from the rest of the command stream. This separate "load texture" sub-stream is an embodiment in which the jump packets are not embedded in the main command stream (and the jump packets, which cause the jumping to the sub-stream may be located in a header of the main command stream). An advantage of the non-embedded embodiment is that the command stream is reusable, whereas, in the case of an embedded command stream (which includes the jump packets), the process of converting the jump packets to valid command data destroys the jump packets. In a non-embedded command stream, the conversion of jump packets can be repeated as necessary, each time with different results. One advantage of embedded jump packets is reading and writing perform because the reads and writes that are required to process the jump packet are to the same memory location.

When a particular region of graphics memory requested by a current client driver has been reused by a previous client driver, the kernel driver completes the use of the memory by the previous client driver, and prepares the resource for use by the current client driver. When the kernel driver processes a tokenized command, the graphics memory referenced by the token may be in one of two states: valid for immediate use by the client driver or not. If the memory is valid for immediate use, the kernel driver proceeds as previously described. If the memory is not valid for immediate use, the kernel driver refreshes the current client's data by allocating a new region of graphics memory and paging the data into it. Before doing this however, the kernel driver submits all graphics commands in the current client's command stream up to the current jump packet to the graphics hardware before it starts allocating the new region of graphics memory for the current client because the process of allocation might result in the deallocation and paging of graphics memory previously referenced in the current command stream. Details of the refreshing of data are described further below in conjunction with FIG. 4B.

Figure 3A:
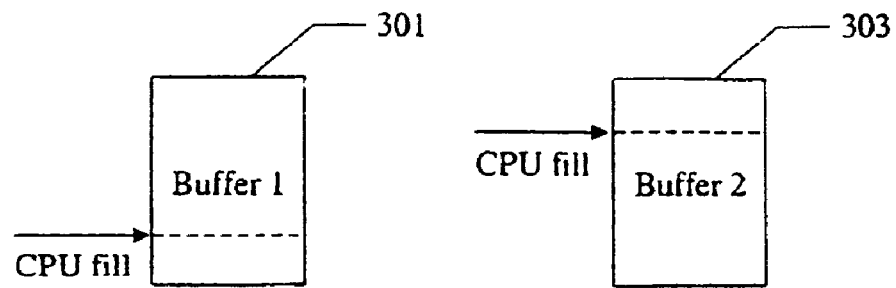
FIG. 3A-C illustrate processing of command buffers according to embodiments of the invention.

Command buffers are commonly used to hold the command streams from multiple clients. As shown in FIG. 3A, as the client driver generates commands, the CPU fills the appropriate buffer 301, 303. When a buffer is full, it is placed in a processing queue for the graphics hardware, and the CPU assigns another buffer to the client driver. It will be appreciated that when jump packets are used, the client driver loads the start jump packet first in the buffer.

The command buffers allow multiple clients to create streams asynchronously to each other. The command buffers also allow the graphics hardware and the CPU to operate asynchronously, keeping both busy even though they typically operate at different speeds.

Figure 3B:
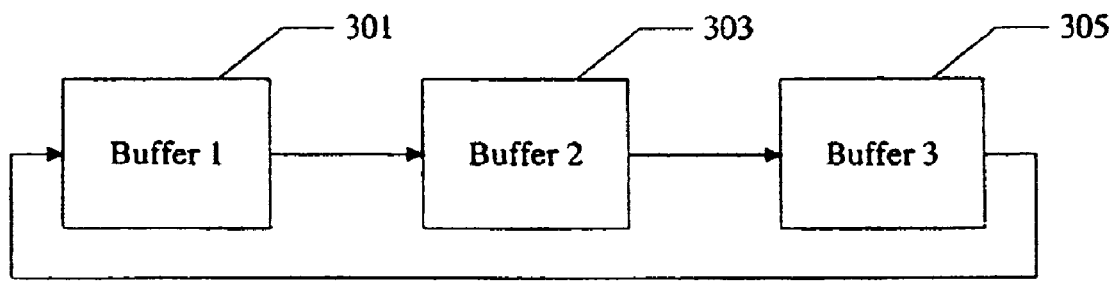

In one embodiment, the queued buffers are arranged as a linked list as shown in FIG. 3B. The contents of the buffers 301, 303, 305 are read by the graphics hardware 111 as a linear stream of commands for execution in a serialized fashion, i.e., all the commands in one buffer are executed before the commands in the next buffer in the queue. The serialized, linear execution by the graphics hardware 111 provides the kernel driver 101 with a memory management timeline to follow in processing the commands that reference graphics memory. After processing by the kernel driver, the entire command stream is valid for consumption by the graphics hardware since the conflicts between clients due to reuse of memory have been resolved and the jump packets and tokenized commands have been replaced with valid graphics hardware commands.

Figure 3C:
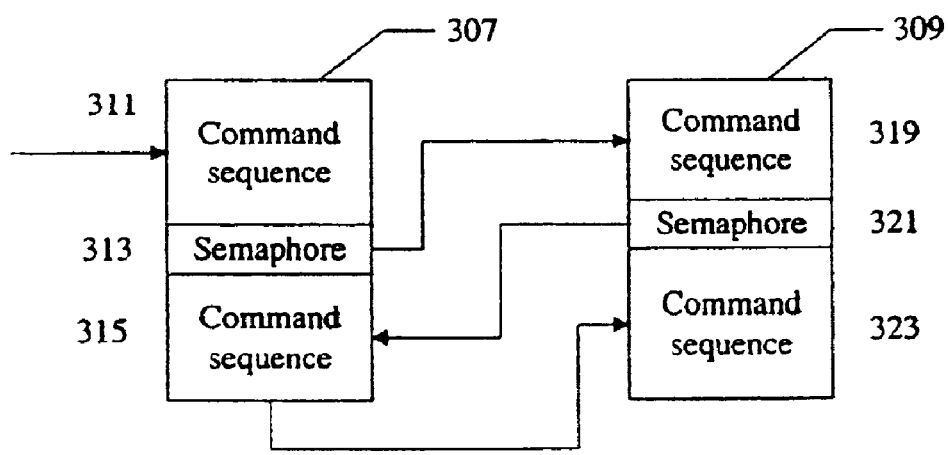

In an alternate embodiment, the identifier for the memory block allocated to the client driver 103 is the virtual address of the memory. Because the client expects memory address to be unchanged until it de-allocates the memory, the kernel driver 101 employs special graphics hardware features to manage the virtualization of memory. In one embodiment, the kernel driver 101 uses graphics semaphores that cause the graphics hardware to suspend processing of one buffer and switch to processing another buffer, thus interleaving the processing of the command buffers from different clients, and creating multiple inter-dependent linear timelines as illustrated in FIG. 3C.

For example, assume client A places a command in buffer 307 that references memory also used by client C. When the kernel driver 101 reaches that command in buffer 307, it inserts a reference to semaphore 313 before the command, effectively dividing the buffer 307 into command sequences 311, 315. The graphics hardware 111 processes command sequence 311 in buffer 307 until it reaches semaphore 313, which directs it to switch to processing the next queued buffer 309. While the graphics hardware 111 is processing buffer 309, the kernel driver 101 pages the appropriate data back in and clears the semaphore 313.

Similarly, assume client B places a command in buffer 309 that references memory also used by client D, so the kernel driver 101 inserts a reference to semaphore 321 in buffer 309, creating command sequences 319, 323. When the graphics hardware 111 reaches semaphore 321, it determines that semaphore 313 s clear and resumes processing buffer 307 at command sequence 315. Because the kernel driver 101 has cleared semaphore 321 by the time the graphics hardware finishes processing command sequence 315, the graphics hardware can now process command sequence 323.

Next, the particular methods of the invention are described in terms of computer software with reference to a series of flowcharts. The methods to be performed by a processing system constitute computer programs made up of executable instructions illustrated as blocks (acts). Describing the methods by reference to a flowchart enables one skilled in the art to develop such programs including such instructions to carry out the methods on suitably configured hardware (the processing unit of the hardware executing the instructions from machine-readable media). The executable instructions may be written in a computer programming language or may be embodied in firmware logic. If written in a programming language conforming to a recognized standard, such instructions can be executed on a variety of hardware platforms and interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in FIGS. 4A-B without departing from the scope of the invention and that no particular order is implied by the arrangement of blocks shown and described herein.

Figure 4A:
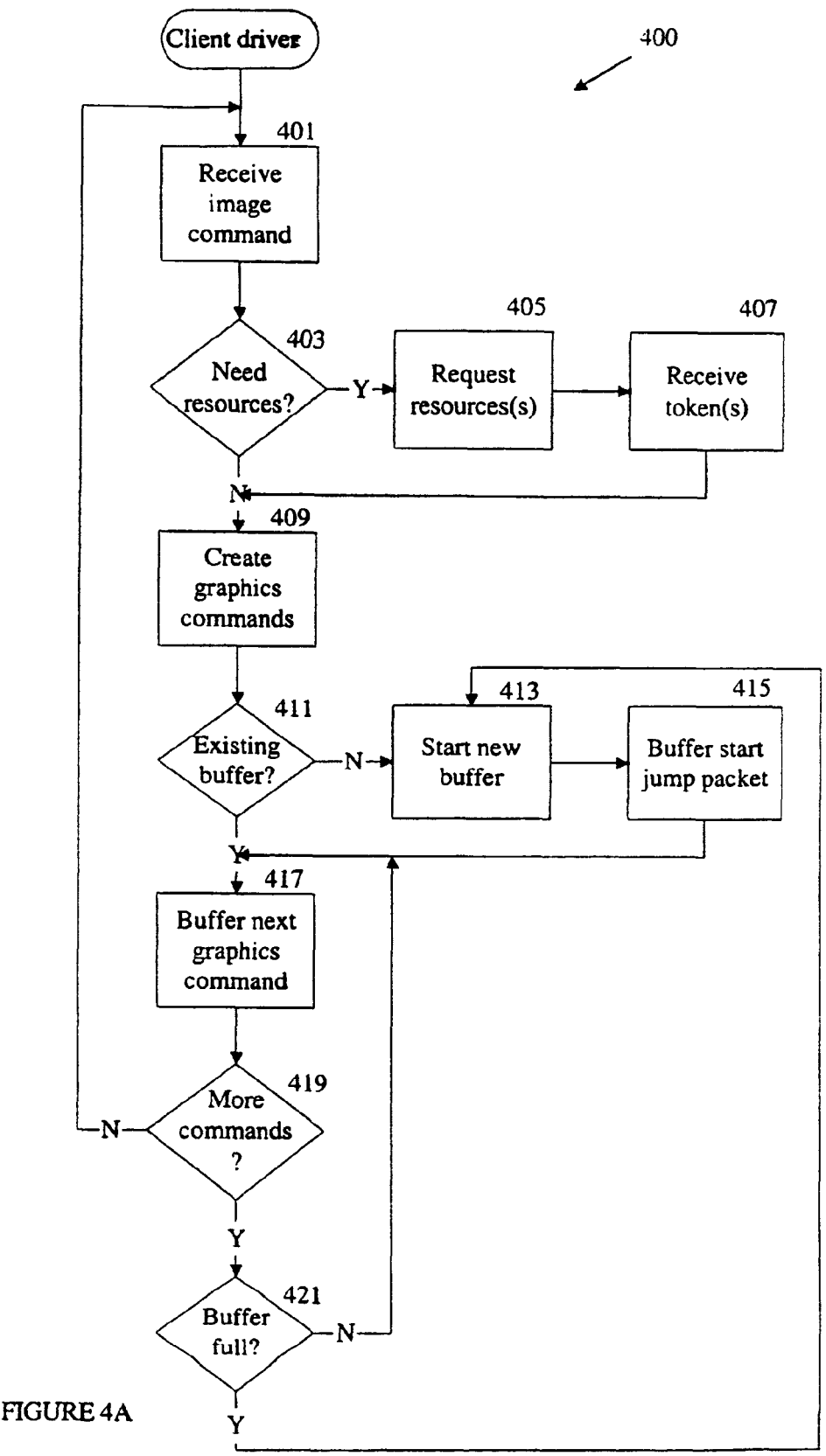
FIG. 4A is a flowchart of a graphics client driver method to be performed by a computer processor according to an embodiment of the invention.

Referring first to FIG. 4A, the acts to be performed by a computer processor executing a client driver method 400 that tokenizes commands are shown. The client driver method 400 receives an image command (block 401) and determines if graphics resources are required to process the command (block 403). If the necessary resources have not been previously allocated, the method 400 requests the resources from the kernel driver (block 405) and receives a token in return (block 407). The method 400 creates the graphics commands to perform the image command at block 409. The processing represented by block 409 includes creating the jump packets with the appropriate offsets and packet types, and inserting the jump packets and tokens in the commands. The particular packet types used by embodiments of the invention are dictated by the command set of the underlying graphics hardware. One exemplary set of packet types, called "op codes," for graphics memory are shown in Table 1.

TABLE 1

| Op Code | Remarks |
| --- | --- |
| kGLStreamStart | Start the stream |
| kGLStreamEnd | Terminate the stream |
| kGLStreamCopyColor | Copy an image between two draw buffers |
| kGLStreamCopyColorScale | Copy an image between two draw buffers with scaling |
| kGLStreamDrawColor | Draw an image to the current draw buffer |
| kGLStreamTexture0 | Set the current texture object on texture unit zero |
| kGLStreamTexture1 | Set the current texture object on texture unit one |
| kGLStreamTexture2 | Set the current texture object on texture unit two |
| kGLStreamTexture3 | Set the current texture object on texture unit three |
| kGLStreamNoTex0 | Remove any texture from texture unit zero |
| kGLStreamNoTex1 | Remove any texture from texture unit one |
| kGLStreamNoTex2 | Remove any texture from texture unit two |
| kGLStreamNoTex3 | Remove any texture from texture unit three |
| kGLStreamVertexBuffer | Set the current vertex object |
| kGLStreamNoVertexBuffer | Remove any current vertex object |

If there is no existing command buffer (block 411), the method 400 starts a new buffer (block 413) and inserts a start jump packet at the beginning of the buffer (block 415) with an offset to the first tokenized command in the buffer. Each graphics command is loaded in the buffer (block 417) until all graphics commands are buffered (block 419) or the current buffer is full (block 421). If the current buffer is full and more commands need to be buffered, the method 400 returns to block 413 to start a new buffer.

Figure 4B:
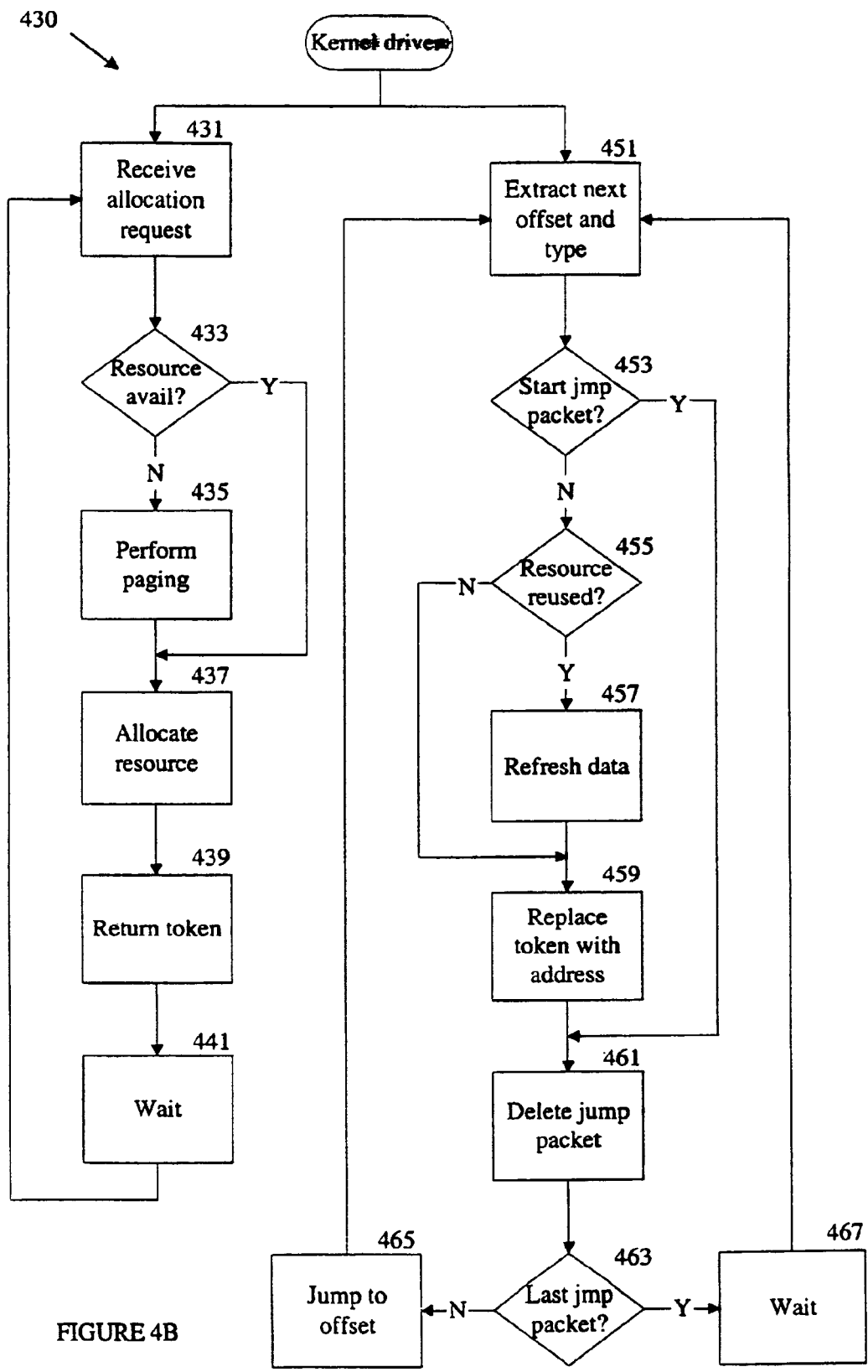
FIG. 4B is a flowchart of a graphics kernel driver method to be performed by a graphics processor according to an embodiment of the invention.

Referring now to FIG. 4B, the acts to be performed by a graphics processor executing a kernel driver method 430 corresponding to the client driver method 400 are shown. The kernel driver method 430 is illustrated as two parallel processing threads, one that interfaces with the client driver (starting at block 431) and one that interfaces with the graphics hardware (starting at block 451). It will be appreciated that the invention is not limited to such parallel processing implementations.

When the method 430 receives an allocation request from a client driver (block 431), it determines if the requested amount of resource is available (block 433). If not, the method 430 pages out a sufficient amount of data belonging to another client (block 435). The method 430 allocates the resource, including assigning a token and updating its memory management information, such as the virtualization map 117 illustrated in FIG. 1B. The token is returned to the requesting client driver at block 439. The client driver method 430 waits until another request is received (block 441) and returns to block 431 to process the new request.

When the client driver submits a buffer of commands to the graphics hardware for processing, the kernel driver method 430 extracts the offset and type from the next jump packet in the buffer (block 451). If the next jump packet is the first jump packet, i.e., a start jump packet (block 453), the method 430 deletes the start jump packet from the buffer (block 461) and jumps to the jump packet defined by the offset (block 465) to continue processing. Otherwise, the method 430 uses the jump packet type to locate the token in the command and determines if the resource corresponding to the token has been reused (block 455). If so, the kernel driver method 430 refreshes the data required by the current command (block 457). Because of the abstraction provided by the token, the kernel driver can page the data into a different available graphics resource or page out the data currently in the original resource and page in the data required by the current command. The token is replaced with the address of the resource (block 459) and the jump packet is deleted (block 461). If the current jump packet is the last in the buffer (block 463), the method 430 waits for another buffer (block 467) and returns to block 451 to process the new buffer. Otherwise, the next jump packet in the buffer is processed.

In an alternate embodiment, the processing represented by block 437 is a logical allocation of the resource to the client driver and the processing represented by blocks 433 through 435 is not performed. The kernel driver method 430 performs the physical allocation, and any necessary paging, when it encounters the first tokenized command that references the resource in the command buffer.

In one embodiment, the kernel driver method 430 uses system memory as its backing store for data that must be paged out of the virtualized graphics resources. The method 430 can request the CPU read the data into system memory, or it can request the graphics hardware to write the data to the system memory. The latter operation can be performed asynchronously with the CPU, but not all graphics hardware may be able to perform the operation or there may be incompatibilities between the graphics hardware and the CPU. When the operating system virtualizes system memory, the operating system may further page the data to mass storage. It will be appreciated that once the data has been written to system memory, a virtual memory operating system may further page the data to mass storage.

In one embodiment, what data to page into system memory is determined by various paging criteria, such as type of graphics resource, priority, and paging algorithm. Some resources, like graphics memory, are very expensive to page because the data contained in the graphics memory often must be copied into system memory. The priorities may be allocated within graphics resources types. For example, texture objects generally have a lower priority than frame buffers when paging graphics memory. Other resources, like GART entries may be paged inexpensively because the paging only requires the modification of the GART table, i.e., no data is actually relocated. Because the relative cost of paging different types of resources is quite different, different paging algorithms are used for each.

For example, when a client driver requests an allocation of memory, it could give a kernel a hint of what purpose the memory is used for. A kernel may receive this request and then try to use the client driver's hint. Such a hint could be one of: must allocate in video memory; must allocate in system memory; prefer in video memory; prefer in system memory. If the hint is "must allocate in video memory" but there is not enough free contiguous memory to service the request, all graphics memory resources owned by all clients are candidates for paging. The first resources selected are owned by other clients because there may be an arbitrarily long period of time before the other clients are run again.

When considering graphics memory owned by the requesting client driver, the kernel driver uses an algorithm that dynamically switches from LRU (least recently used) to MRU (most recently used) based on whether or not the client driver is overcommitted in its texture usage. An overcommitted application is an application that uses more texture memory in rendering a single frame than can be supplied by the graphics hardware. When a client driver that is not overcommitted runs out of graphics memory it is because some user input has caused the client driver to render a new scene so the LRU algorithm is used, based on the assumption that the least recently used memory resources may never be used again. When a client driver that is overcommitted runs out of graphics memory this means that it will do so cyclically every frame, so the MRU algorithm is chosen because an LRU algorithm would result in every memory resource owned by the client driver being paged one or more times per frame.

For example, if the hint is "preferred in video memory" and all video memory is already allocated, then no paging may be involved. But the underlining hardware's requirement can still override the client driver's hint. After some resources are paged out, the kernel can still manage to have the client driver keep access to the now paged out resource with the virtualization mechanism. Since the client driver can hold a virtualized pointer, any such underline movement may not be known to the client driver. Next time when the current paged out resource is used, it still may have the choice to either page it back into video memory or leave it in system memory. The kernel driver may be able make this decision based upon hardware specification and the client driver's hint as well as the current state of the resource usage.

GART entry paging is managed differently because the cost of changing GART entries is essentially unrelated to the size of the memory resource. The first candidates for paging are GART entries that may never be used again. For example, graphics memory texture objects each have a GART entry that was used to transfer the texture from system memory to graphics memory. Once the texture has been moved to graphics memory, the GART entry will never be used again unless the texture is paged from graphics memory and then reloaded. Therefore, it is likely that choosing such a GART entry for paging will have no performance cost. The remaining GART entries are categorized from highest to lowest priority for paging, with the lowest priority assigned to the GART entry for each client's command buffer, which must be mapped into GART for the client driver to use the graphics hardware at all.

One of skill in the art will appreciate that other types of graphics resources may have different algorithms for selecting which resources are candidates for paging that allow the resources to be transparently managed with respect to multiple clients as described above for graphics memory and GART.

In one embodiment, the kernel driver method 430 uses a collection of data objects, each of which represents an allocated resource, as a virtualization map. The tokens identify the data objects within the virtualization map. Each data object contains the address range for the corresponding resource. When the data in the resource is paged out, a "dirty" flag is set and a pointer to the backing store holding the data is stored in the object. It will be appreciated that the layer of abstraction between the client and the physical resources provided by the token allows the data to be paged into a resource address different than it previously occupied without the client driver being aware of the change.

Figure 5A:
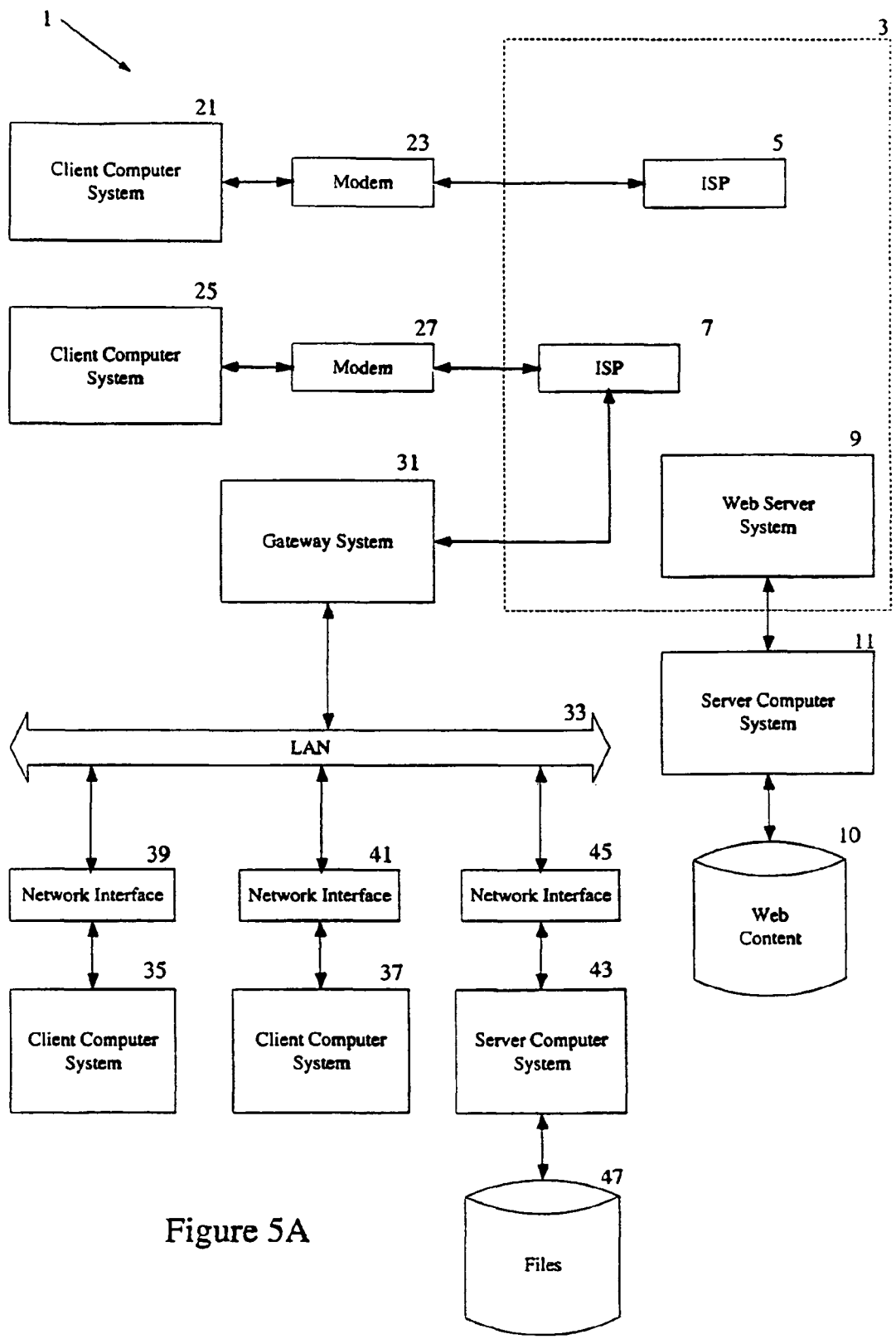
FIG. 5A is a diagram of one embodiment of an operating environment suitable for practicing the present invention.
Figure 5B:
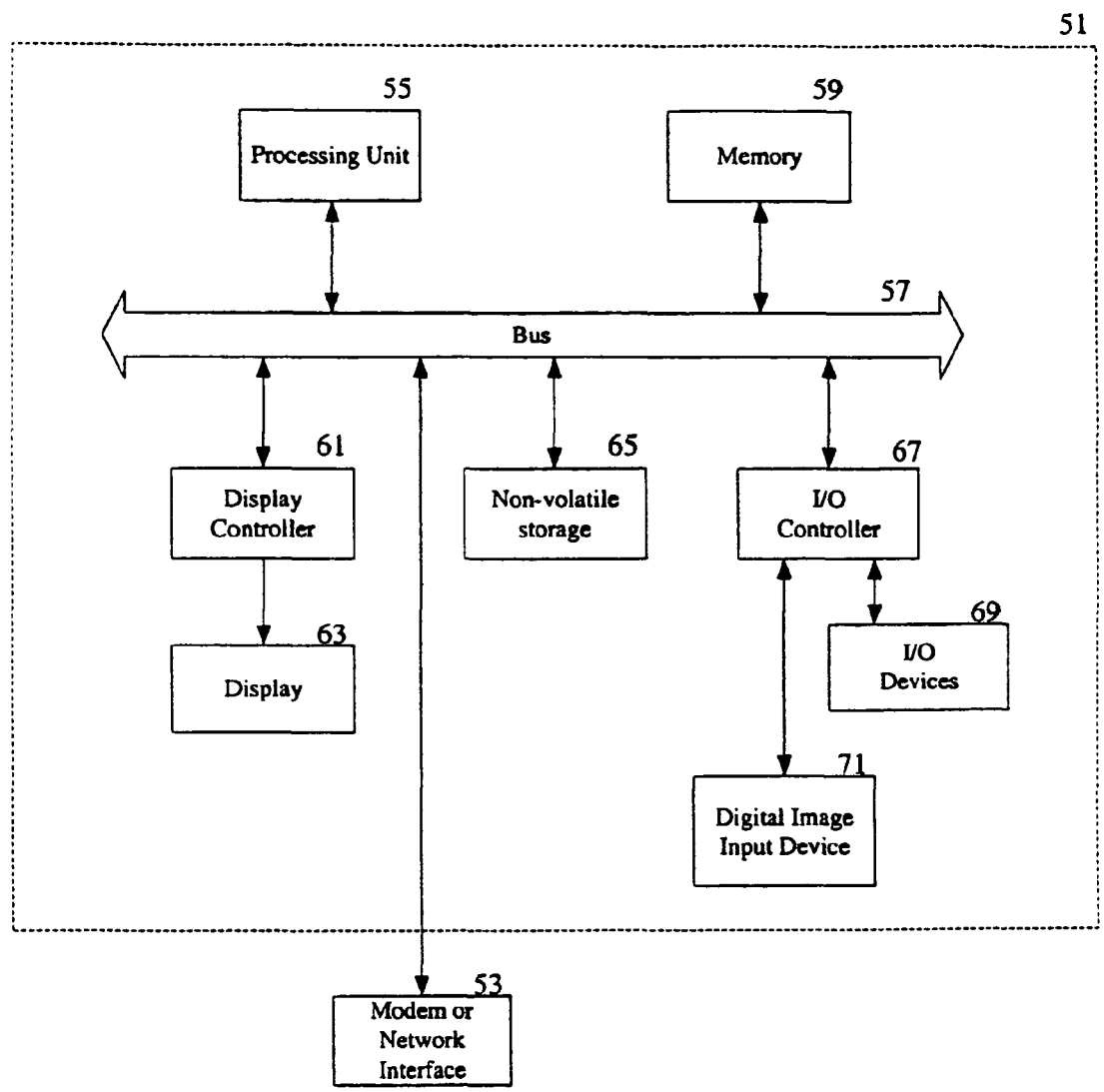
FIG. 5B is a diagram of one embodiment of a computer system suitable for use in the operating environment of FIG. 5A.

The following description of FIGS. 5A-B is intended to provide an overview of computer hardware and other operating components suitable for performing the methods of the invention described above, but are not intended to limit the applicable environments. One of skill in the art will immediately appreciate that the invention can be practiced with other processing system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. FIG 5A shows several computer systems that are coupled together through a network 3, such as the Internet. The term "Internet" as used herein refers to a network of networks which uses certain protocols, such as the TCP/IP protocol, and possibly other protocols such as, for example, the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 5A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 5A, the connections are not the same for these three computer systems. Client computer system 25 is coupled through a modem interface 27 while client computer systems 35 and 37 are part of a LAN. While FIG. 5A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 5B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65, which may be a hard drive that stores the operating system software that boots the system, and to display controller 61 and to the input/output (I/O) controller 67. The display controller 61 controls a display on a display device 63, such as, for example, a cathode ray tube (CRT) or liquid crystal display, in accordance with the present invention. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "machine-readable medium" and "computer-readable medium" includes any type of storage device that is accessible by the processor 55 and also encompasses a carrier wave that encodes a data signal.

Figure 6A:
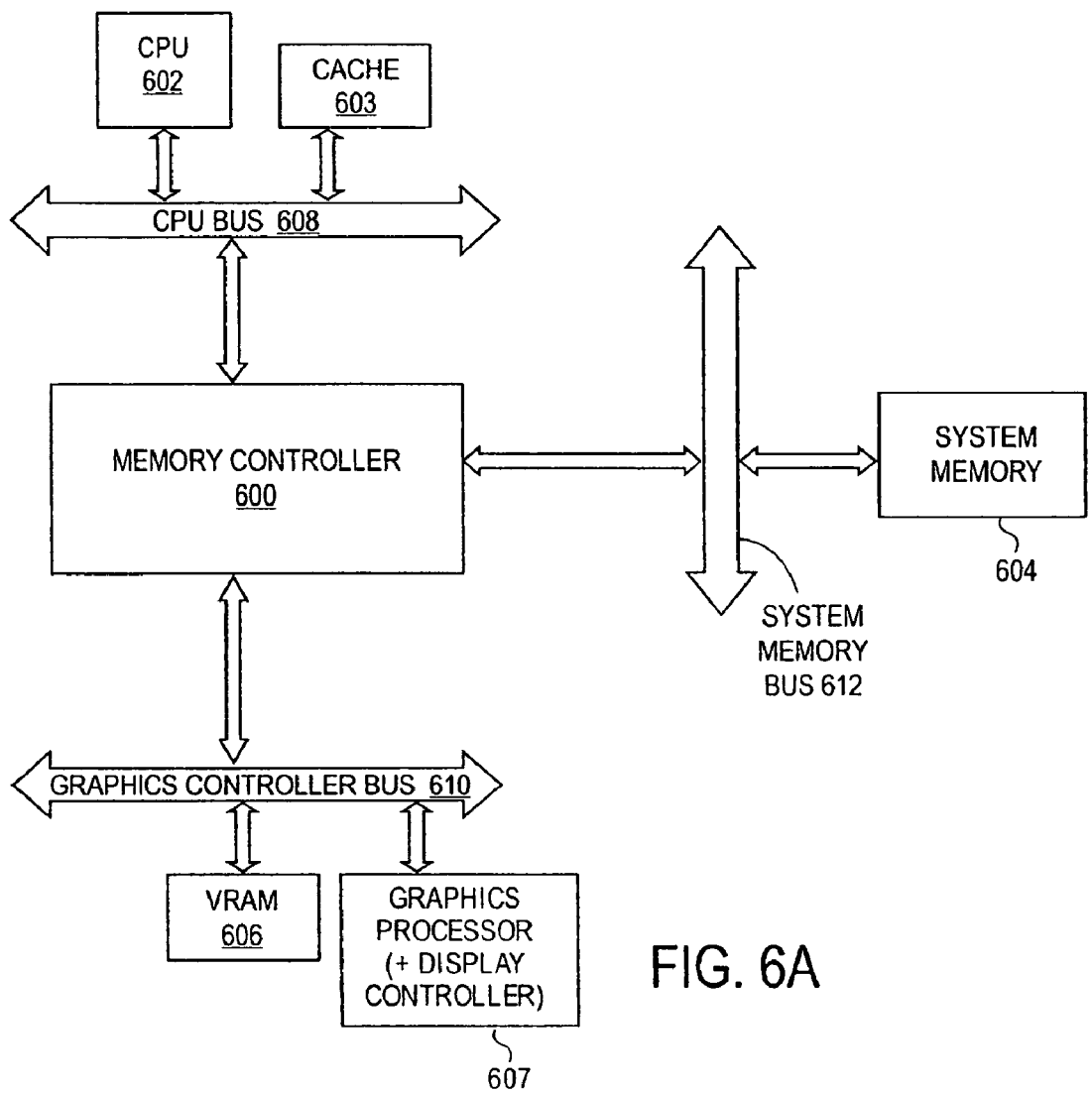
FIG. 6A is a hardware system for implementing command buffer writes and fast-writes according to one embodiment.

FIG. 6A is a hardware system for implementing command buffer writes (e.g., as will be explained in FIG. 6B) and fast-writes (as will be explained in FIG. 7) according to one embodiment. The system of FIG. 6A may use an operating system software which virtualizes the system memory (by using a hard drive or other mass storage, such as a non-volatile storage 65, to create a physical backing store for the system memory) and may also use either the operating system software or kernel graphics software, which may be executing on the graphics processor 607, to virtualize the video memory (e.g. VRAM 606) (e.g. by using the system memory and/or the mass storage to create a physical backing store for the video memory). In certain embodiments, both the system memory and the video memory are virtualized by using a virtual memory system which translates virtual addresses to physical addresses; in other embodiments, only the video memory may be virtualized by using a virtual memory system which translates virtual addresses of the video memory to physical addresses of the video memory. In FIG. 6A, a central processing unit (CPU) 602 (which may be a microprocessor such as a Power PC or Pentium microprocessor), a cache 603, a system memory 604 (e.g. DRAM), a video memory (e.g. VRAM) 606, and a graphics processor with optional display controller 607 are connected to each other through a memory controller 600. A CPU bus 608 connects the CPU 602 (e.g., a microprocessor) and the cache 603 (e.g., an off-chip and/or on-chip cache) to the memory controller 600. In one embodiment, the CPU bus 608 is a 3.4-gbits/second bi-directional bus. A system memory bus 612 connects the system memory 604 (e.g., dynamic random access memory, non-volatile storage, volatile storage, etc.) to the memory controller 600. This memory controller 600 typically controls the refreshing of the system memory (because the system memory is (in certain embodiments) volatile memory such as conventional dynamic random access memory (DRAM) and also controls the reading and writing of data from and into the system memory. The graphics processor typically controls the refreshing of the video memory, which may be volatile video random access memory (VRAM) which is often dual ported memory, and the graphics processor also typically controls the reading and writing of the video memory, such as the reading of the data in the frame buffer portion of the video memory in order to refresh a short persistence display device such as a CRT or LCD display. In one embodiment, the system memory bus 612 is a 6.8-gbits/second uni-directional bus, with an actual uni-directional throughput of 2.4 gbits/second for back-to-back read/write operations (e.g., rather than 6.8 gbits/second uni-directional because of inefficiencies within the system memory bus 612 such as switch-over delay when performing back to back read/write operations).

A graphics controller bus 610 connects the VRAM 606 and the graphics processor (with optional display controller) 607 to the memory controller 600. A display device, such as an LCD display or a CRT monitor, may be coupled to, depending on the implementation, either the graphics processor (with its display controller) or to one of two ports of the VRAM 606 if the VRAM has dual ports. The memory controller 600 may be part of system core logic, such as an integrated circuit which is often referred to as a "Northbridge" chip, and there is often a bus bridge between the memory controller 600 and the graphics controller bus 610 as is known in the art. In one embodiment, the graphics processor 607 is a graphics microprocessor within a graphics controller. In one embodiment, the graphics controller includes a video memory to write store a resource to a physical memory location of the video memory. In another embodiment, the graphics processor 607 is communicatively coupled to the video memory (e.g., a VRAM 606) to receive the resource from a client application (e.g., a drawing application, a graphics application, etc.) of a computing device (e.g., CPU 602), based on a translation of a virtual address of a portion of the video memory to the physical memory location. In one embodiment, the client application provides the virtual address to an operating system of the computing device. In another embodiment, the video memory transitions a resource to another physical memory location based on a request from a graphics kernel (e.g., the graphics kernel driver 101) in an operating system of the computing device. The another physical memory location may be a location within a system memory 604. In one embodiment, the graphics controller restricts access to the physical memory location if data within the physical memory location is in transition. Furthermore, the graphics controller may receive resources from a computing device that has assembled the resource within a buffer in one embodiment, as will later be described in FIG. 8.

The graphics controller bus 610 may be an Accelerated Graphics Port (AGP) bus, a Peripheral Component Interconnect (PCI) bus, a PCI Express bus, and/or any other type of bus between a memory controller and graphics hardware. In one embodiment, the graphics controller bus 610 is 2 gbits/second uni-directional bus, with an actual uni-directional throughput of 1.8 gbits/second. In another embodiment, the actual performance of the system memory bus 612 is faster than the graphics controller bus 610 even for back to back read/write operations.

Command Buffer Embodiment

Figure 8:
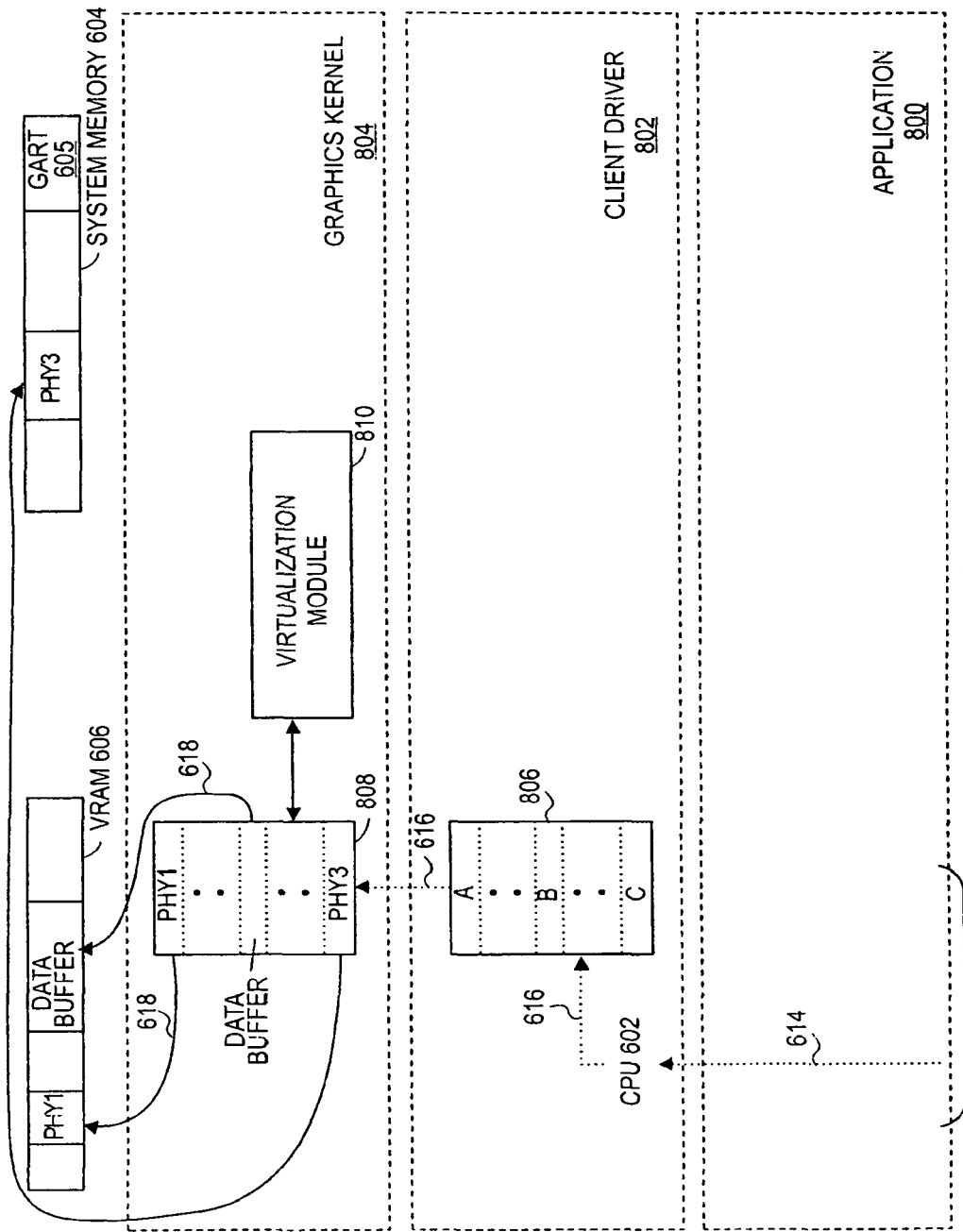
FIG. 8 is a data flow diagram illustrating the use of command buffers and a virtualization module to generate the hardware interaction shown in FIG. 6B according to one embodiment.

FIG. 6B is a hardware interaction diagram for command buffer writes according to one embodiment. An exemplary command buffer write process is illustrated in FIG. 6B through operations 614, 616, and 618. The command buffer write process shown in FIG. 6B may be preferred when the actual performance system memory bus 612 is faster than the graphics controller bus 610 even for back to back read/write operations. The operations 614, 616, and 618 in FIG. 6B are best explained in conjunction with FIG. 8. FIG. 8 is a data flow diagram illustrating the use of buffers 806 and 808 (e.g., these buffers may be command buffers 806, 808) and a virtualization module 810 to generate the operations 614, 616, and 618 in FIG. 6B according to one embodiment. The operations shown in FIG. 8 are referred to as the command buffer write path 812.

First, in operation 614 of FIG. 6B, the CPU 602 retrieves resources (e.g., resources may be write candidates of an application 800 as shown in FIG. 8 such as textures, graphics vectors, and/or other write candidates A, B, C) from system memory 604. Next, in operation 616 of FIG. 6B, the CPU 602 organizes and places the resources into a command buffer, such as a command buffer 806 in FIG. 8 within a client driver 802 (e.g., a client driver may be one of a plurality of client drivers, such as an OpenGL client 103 as shown in FIG. 1).

Figure 10:
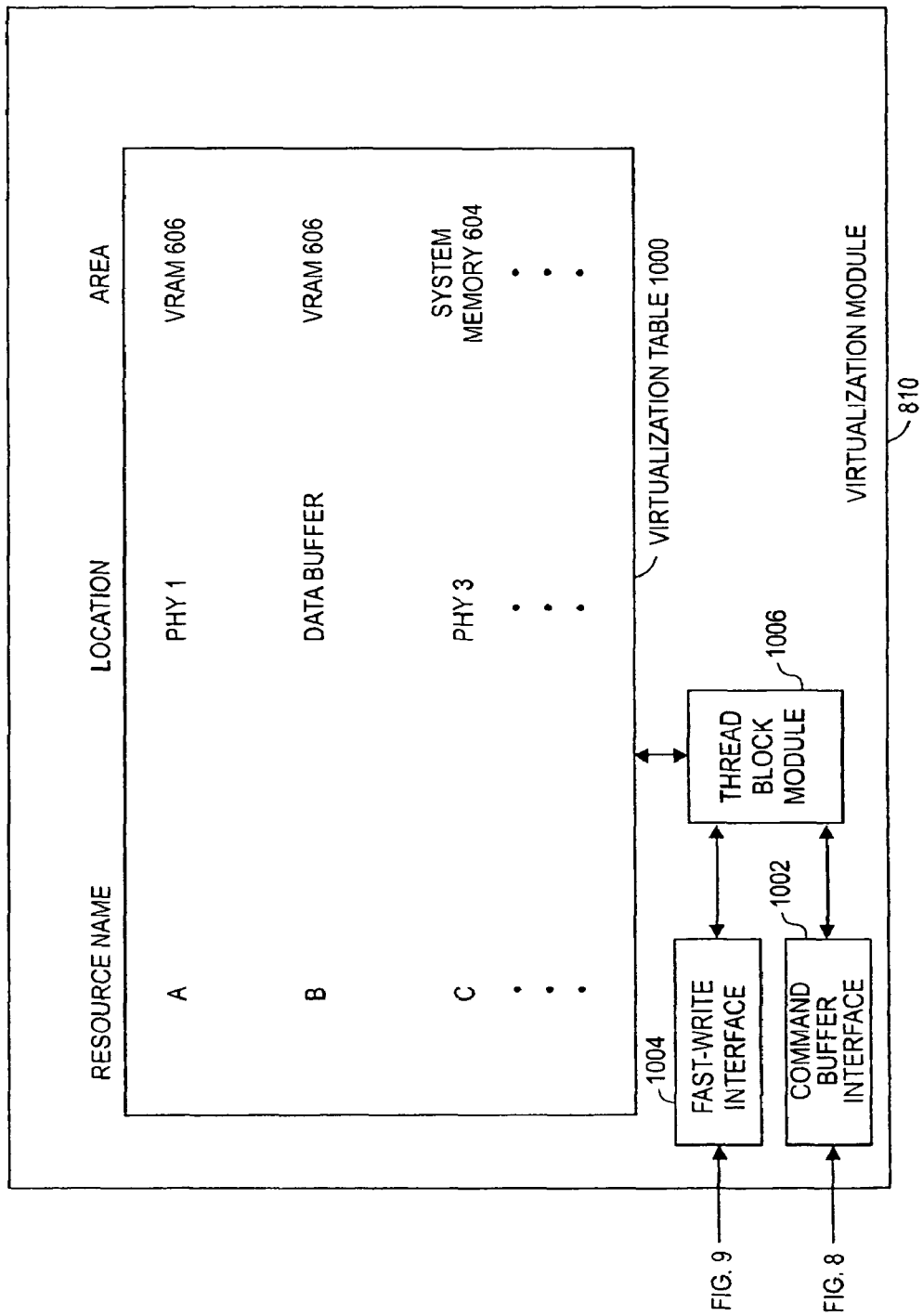
FIG. 10 is an exploded view of a virtualization module having a fast-write interface, a command buffer interface, a thread block module, and a virtualization table according to one embodiment.

In one embodiment, in operation 616, the CPU 602 may create (e.g., or may populate) another command buffer 808 (as shown in FIG. 8) by referencing each one of the resources within the command buffer 806 (e.g., resources A, B, C as shown within the command buffer 806 of FIG. 8) to a virtualization table 1000 (e.g., as shown in FIG. 10) within a virtualization module 810. The virtualization module 810 may be created within a graphics kernel 804 (e.g., the graphics kernel 804 may be a kernel driver 101 as shown in FIG. 1A) in one embodiment. In addition, the virtualization table 1000 may be the virtualization map 117 shown in FIG 1B. Furthermore, a virtualization module 810 may generate the virtualization table 1000, which may be a data structure having an identifier (e.g. a virtual address) of a graphics resource assigned to a physical memory location in video memory, system dynamic random access memory, and/or at least one storage device. In another embodiment, the command buffer 806 and the command buffer 808 may be grouped together in contiguous or non-contiguous physical data blocks within the system memory 604 (e.g., are actually just one buffer, rather than two), and are updates of the same buffer space. In one embodiment, a graphics resource is assembled into at least one buffer in the system memory 604, and transmitted to the VRAM 606 using the at least one buffer.

In FIG. 8, the CPU 602 converts each resource within command buffer 806 to a pointer (e.g., virtual address or other identifier) to a physical location (e.g., a physical block of memory) within a memory such as VRAM 606 and/or system memory 604 (e.g., the system memory may be non-volatile storage 65 and/or memory 59 as shown in FIG. 5B) using the virtualization module 810. Specifically, the virtualization module 810 in FIG. 8 includes the virtualization table 1000 as shown in FIG. 10. FIG. 10 shows a resource "A" from command buffer 806 has been referenced to physical location 1 (Phy 1) within VRAM 606, a resource "B" in command buffer 806 has been referenced to a data buffer (Data Buffer) within the VRAM 606 (e.g., the data buffer may be a collection of consecutive and/or non-consecutive blocks in the VRAM 606); and resource "C" in command buffer 806 has been referenced to a physical location 3 (Phy 3) within system memory 604. Resource "C" in command buffer 806 is be referenced to a physical location (e.g., Phy 3) which resides in system memory 604 rather than VRAM 606. This happens when the virtualization table 1000 (see FIG. 10) within the virtualization module 810 references a location (e.g., Phy 3) within system memory 604 to a particular resource (e.g., resource "C"). A graphics address relocation table (GART table 605) within the system memory 604 may be used by the virtualization module 810 to reference the resource "C" to a specific location within system memory 604 based on a lookup within a GART table 605 within the system memory 604.

After the command buffer 808 has been populated by pointers to physical memory addresses, the command buffer 808 may be emptied by transferring the resources from system memory 604 to other physical locations in system memory 604 (e.g., based on the GART table as described herein) and/or VRAM 606. For example, referring back to FIG. 6B, in operation 618 resources (A and B in FIG. 8) are copied from system memory 604 into physical locations (e.g., Phy 1 and Data Buffer respectively) in VRAM 606. Operation 618 may be a DMA (direct memory access) operation in which data from the system memory 604 is read from memory 604 and written into VRAM 606 without the involvement for the CPU 602. Operation 618 is also shown in FIG. 8, where physical address pointers (e.g., "Phy 1" and "Data Buffer") within command buffer 808 transfer resources (e.g., resource A and B respectively) to physical locations (e.g., Phy 1 and Data Buffer block addresses within the VRAM 606 and the system memory 604) during operation 618. Thus, FIG. 6B shows how data is transferred (read from) system memory 604 into the CPU 602 in operation 614 and is processed (in the CPU 602) to derive further data which is written to system memory 604j in operation 616. Then, in operation 618 (which may be a DMA operation), the further data is read from system memory 604 and written into the VRAM 606.

Fast-Write Embodiment

Figure 7:
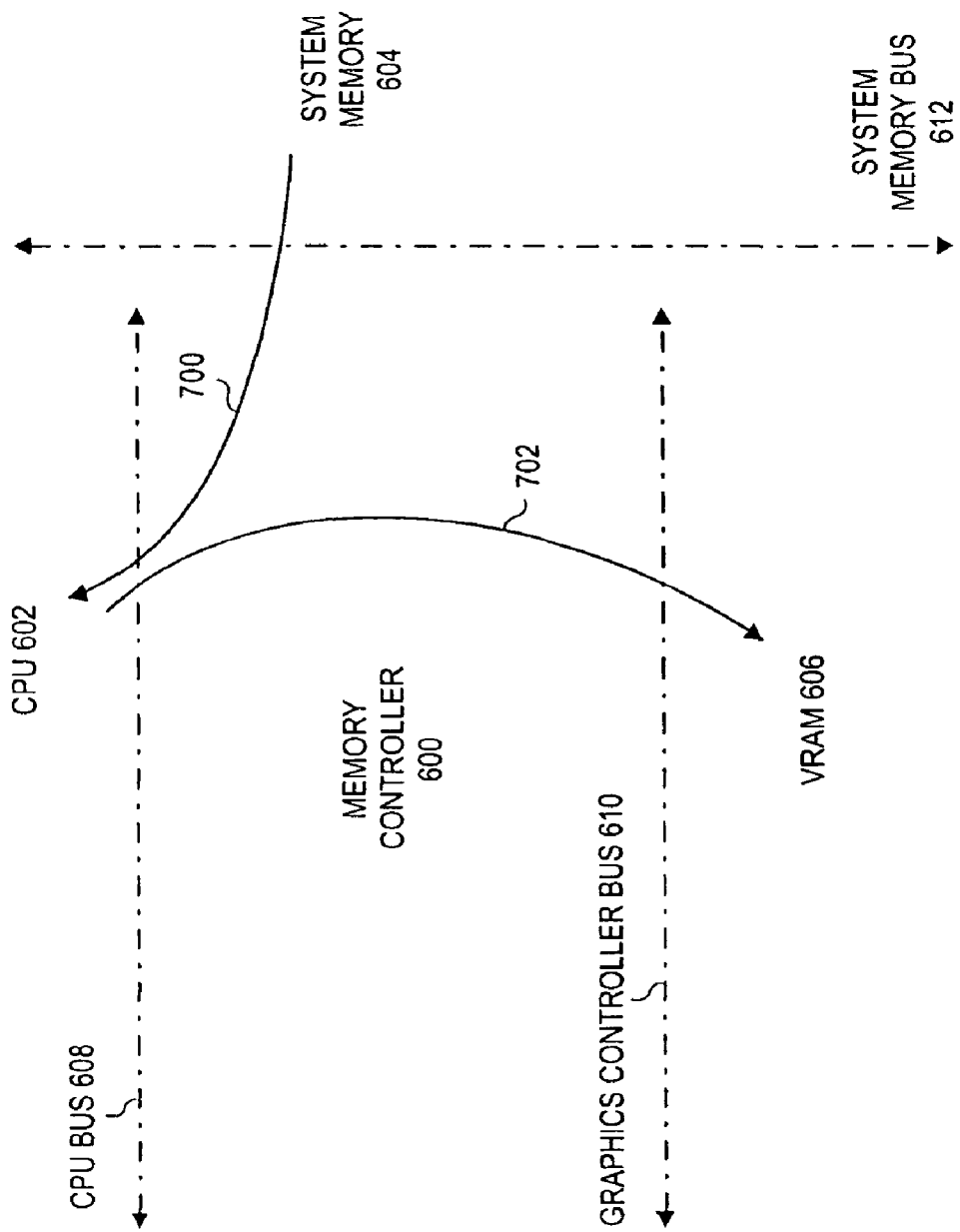
FIG. 7 is a hardware interaction diagram for fast-writes according to one embodiment.
Figure 9:
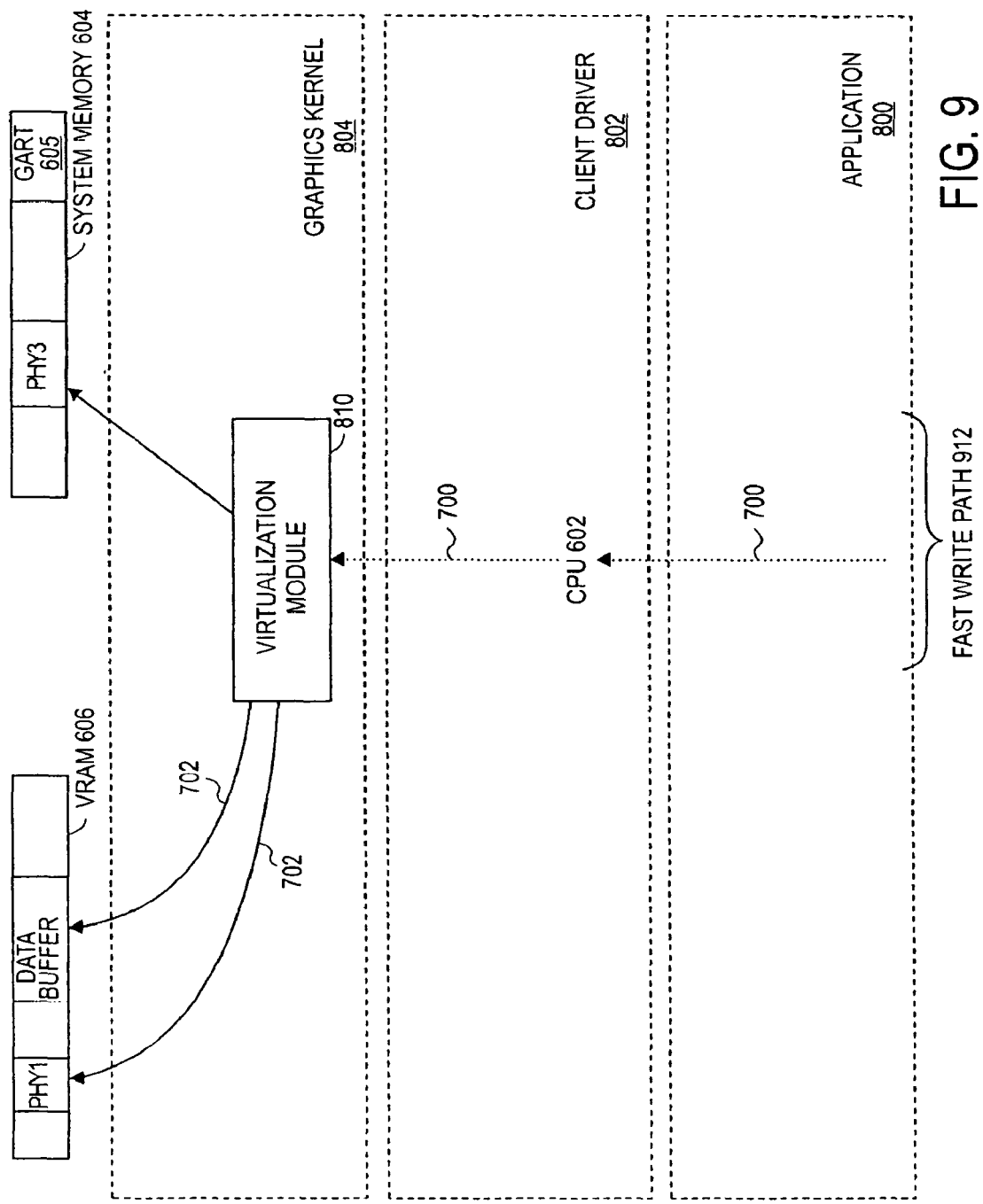
FIG. 9 is a data flow diagram illustrating the use of a virtualization module within the graphics kernel to generate the hardware interaction shown in FIG. 7 according to one embodiment.

FIG. 7 is a hardware interaction diagram for fast-writes according to one embodiment. FIG. 7 differs from FIG. 6B in that there is only one operation (e.g., read operation 700) across the system memory bus 612 in FIG. 7, verses three operations (614, 616, and 618) across the system memory bus 612 in FIG. 6B. As such, the implementation shown by the hardware interaction in FIG. 7 (e.g., FIG. 9 illustrates the implementation shown by the hardware interaction in FIG. 7 as a fast-write path 912) may be preferred when the system memory bus 612 is a bottleneck because of its performance (e.g., the system memory bus 612 operates slower than other buses) and/or inefficiencies within the system memory bus 612 (e.g., inefficiencies when system memory bus 612 operates slower when there are back to back read/write operations as described in FIG. 6A because of switch-over delays). In addition, the implementation shown in FIG. 7 may be preferred when the actual performance of the graphics controller bus 610 is faster than the system memory bus 612 even for back to back read/write operations. In one embodiment, a graphics resource is extracted from the system memory 604 through a single operation, and transmitted to a VRAM 606.

An exemplary fast-write (e.g., CPU direct write) to video process is illustrated in FIG. 7 through operations 700 and 702. The fast-write (e.g., CPU direct write) to video memory process shown in FIG. 7 may be preferred since it alleviates at least one burden of on the system memory controller. Sometimes the system memory controller is already burdened due to application's access to the system memory. If graphics content is also first written to system memory and then subsequently moved to the video memory, all these operations will go through the system memory controller and add extra burden to it. In such an embodiment, system memory controller could easily become the bottle neck of the whole system. The operations 700 and 702 in FIG. 7 can be explained in conjunction with FIG. 9. FIG. 9 is a data flow diagram illustrating the use of the virtualization module 810 within the graphics kernel 804 to generate the operations 700 and 702 in FIG. 7 according to one embodiment.

First, in operation 700 of FIG. 7, the CPU 602 retrieves resources (e.g., resources may be write candidates of an application 800 as previously described with respect to FIG. 8 such as textures, graphics vectors, and/or other write candidates A, B, C) from system memory 604. FIG. 9 illustrates that operation 700 is performed in conjunction with the virtualization module 810. Particularly, rather than creating/populating any command buffer(s), as previously described with respect to FIG. 6B and FIG. 8, a fast-write interface 1004 (shown in FIG. 10) within the virtualization module 810 in FIG. 9 receives references to resources and/or resources directly from CPU 602. The fast-write interface 1004 in FIG. 10 enables the virtualization module 810 in FIG. 9 to bypass the command buffers and process resources received from the CPU 602 as they arrive to the virtualization module 810.

By bypassing the command buffers required in the implementation of FIG. 6B, read/write operations across the system memory bus 612 in FIG. 7 are minimized because resources are not transferred back and forth from CPU 602 to system memory 604 as required when preparing resources for writing into a physical memory location using command buffers (e.g., command buffers 806 and 808).

The referencing of resources to pointers to physical locations within memory described in FIG. 8 for resources A, B, and C using the virtualization module 810 may still be performed. The virtualization module 810 in FIG. 9 applies pointers to physical memory addresses for each resource received into the virtualization module in operation 700, and resources may be written directly from the CPU 602 into memory. For example, operation 702 in FIG. 7 shows that resources are written directly into VRAM 606 from the CPU 602. Operation 702 is illustrated in further detail in FIG. 9, which shows that two resources (e.g., resources may be resource A and B as previously described in FIG. 8) are written directly into two physical locations (e.g., Phy 1 and Data Buffer respectively) in VRAM 606.

FIG. 10 is a view of a virtualization module having a command buffer interface 1002, a fast-write interface 1004, a thread block module 1006, and a virtualization table 1000 according to one embodiment. The operation of the virtualization table 1000 has been previously described in detail with reference to FIG. 8. The command buffer interface 1002 within the virtualization module 810 shown in FIG. 10 is used in conjunction with the operations shown in FIG. 6B and FIG. 8. The command buffer interface 1002 receives resources from the command buffer 808 in FIG. 8. The command buffer interface 1002 references each resource received from the command buffer 806 to a pointer to a physical memory address within either VRAM 606 and/or system memory 604 (e.g., system memory 604 may include a variety of memory types including RAM, hard drives, etc.). The fast-write interface 1004 within the virtualization module 810 shown in FIG. 10 is used in conjunction with the operations shown in FIG. 7 and FIG. 9. The fast-write interface 1004 pulls resources directly from an application 800 using the CPU 602 as previously described with reference to FIG. 9, to enable fewer read/write operations across the system memory bus 612.

A thread block module 1006 is also illustrated in FIG. 10. The thread block module 1006 provides the virtualization module 810 with the ability to put a resource, received by either the command buffer interface 1002 and/or the fast-write interface 1004, into a hold state if the resource (e.g., A, B, C, etc.) attempts to reference a specific pointer within the virtualization table 1000 that points to a physical block location (e.g., Phy 1, Data Buffer, Phy 3, etc.) in the process of being moved (e.g., movement for optimization purposes by the graphics kernel 804 in FIG. 8 using CPU 602, which may move physical block pointers within the virtualization table 1000 solely using the graphics kernel 804 and without the client driver 802's knowledge). Therefore, the thread block module 1006 will block access until the virtualization table 1000 has been updated with new pointers to physical addresses. If the pointers within the virtualization table 1000 are not being updated (e.g., there is no transition of data from system memory 604 to VRAM 606, and there is no reverse transition from VRAM 606 to system memory 604), the thread block module 1006 operates as a pass through (e.g., authorizes access to the physical memory location) to the virtualization table 1000 from the fast-write interface 1004 and the command buffer interface 1002. In one embodiment, the thread block module 1006 may block access to the physical memory location if a data within the physical memory location is in transition between VRAM 606 and system memory 604 wherein a client application (e.g., the OpenGL Client 103 in FIG. 1) accesses memory in the system memory 604 directly and accesses memory in the VRAM 606 through a virtualization map 117 (as shown in FIG. 1B), such as the virtualization table 1000.

Figure 11:
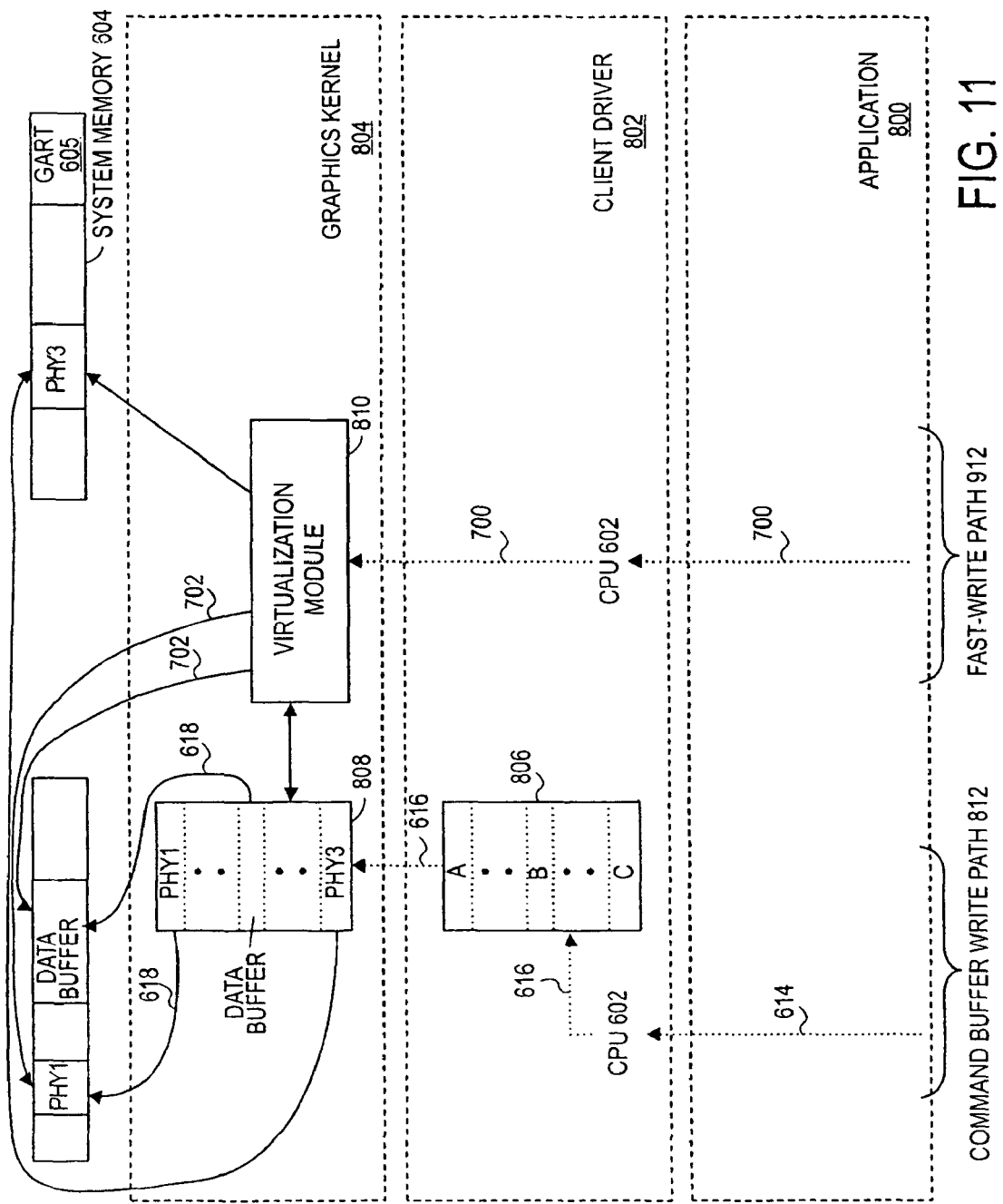
FIG. 11 is a data flow diagram illustrating a system that can perform fast-writes and command buffer writes, according to one exemplary embodiment.

FIG. 11 is a data flow diagram illustrating a system that can perform fast-writes and command buffer writes, according to one exemplary embodiment. The system in FIG. 11 combines the features of the data flow diagram for command buffer writes illustrated in FIG. 6B and FIG. 8, and the data flow diagram for fast-writes illustrated in FIG. 7 and FIG. 9. Both the command buffer write path 812 and the fast-write path 912 may be used simultaneously if. The system in FIG. 11 allows a designer (e.g., a software engineer) to optimize a memory system based upon the speed of the system memory bus 612 (as in FIG. 6A) and/or the graphics controller bus 610. In one embodiment, a designer may select the fast-write path for writing into memory, shown in FIG. 11 by operations 700 and 702, when the actual performance (e.g., speed) of the graphics controller bus 610 is superior to the system memory bus 612. In another embodiment, a designer may select the command-buffer write path for writing into memory, shown in FIG. 11 by command buffer 806, command buffer 808, when the performance of the system memory bus 612 is superior to the graphics controller bus 610. In another embodiment, the system can automatically choose between using the fast-write path and/or the command buffer write path based upon the availability of processing power (e.g., processing power of a microprocessor within the computer system verses processing power of a microprocessor within a graphics controller).

Figure 12:
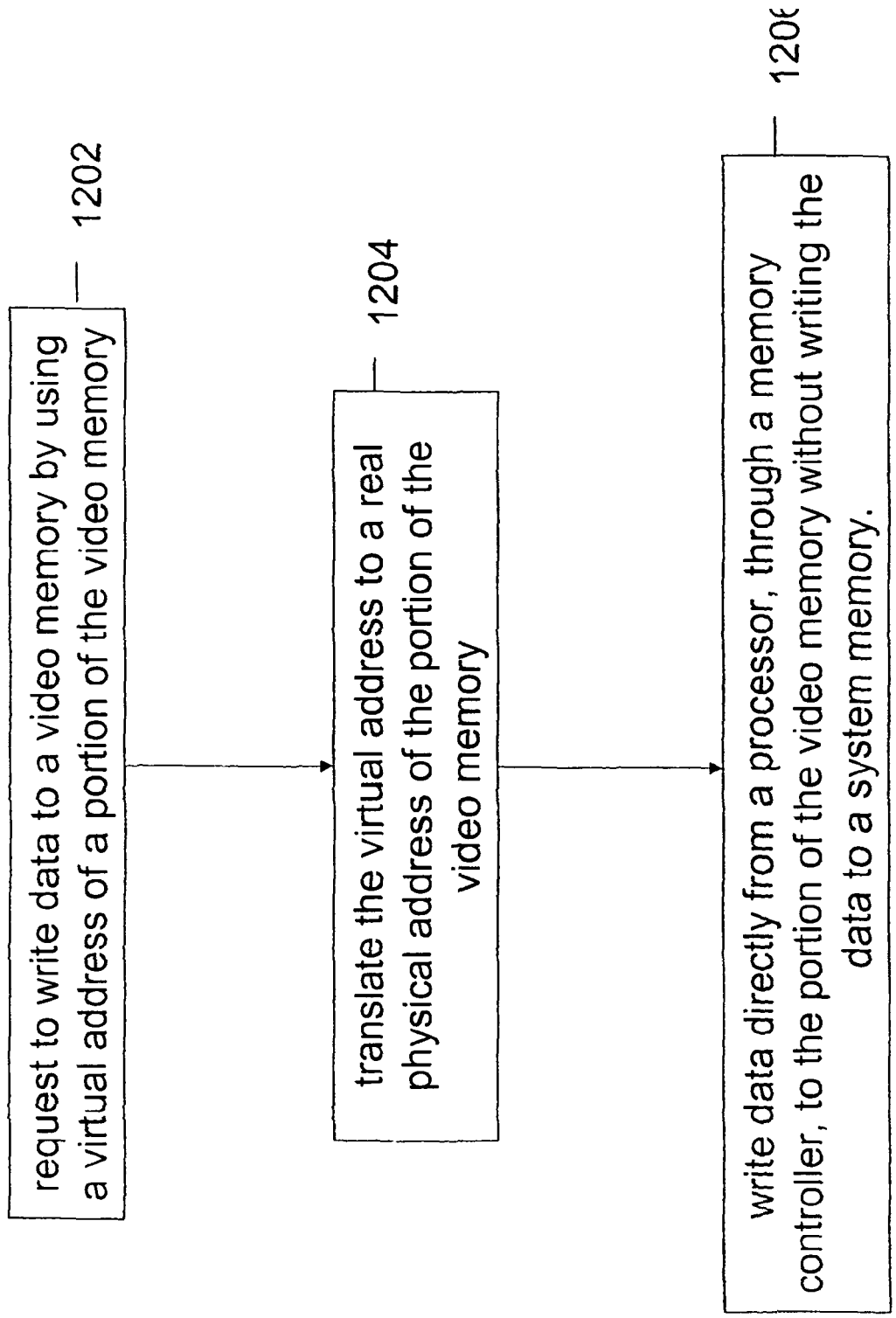
FIG. 12 is a process flow of a virtual address translation to write data into video memory, according to one exemplary embodiment.

FIG. 12 is a process flow of a virtual address translation to write data into video memory, according to one exemplary embodiment. This embodiment is similar to the fast write embodiment shown in FIG. 7. In operation 1202, a client (e.g., such as a client driver 103-109) requests a graphics kernel 804 or another software component to write data to a video memory (e.g., VRAM 606) by using a virtual address of a portion of the video memory. In operation 1204, the graphics kernel 804 (or other software component) translates the virtual address to a real physical address of the portion of the video memory. In one embodiment, the translating is performed using a virtualization map 117 (e.g., see FIG. 1B) which associates a virtual address or token to a physical address of a video memory. In another embodiment, the translating the virtual address to the real physical address using the virtualization map 117 permits an access between a client application and the video memory. In one embodiment, the access permits both read and write functions between the client application and the video memory. The functions may be read and write functions between the client application and the video memory. In operation 1206, the system writes data directly from a processor (e.g., a CPU 602), through a memory controller (e.g., a memory controller 600 as shown in FIG. 6A), to the portion of the video memory without writing the data to the system memory 604. In one embodiment, a memory fault (e.g., error) is received if existing data of the portion of the video memory is in transition.

Figure 13:
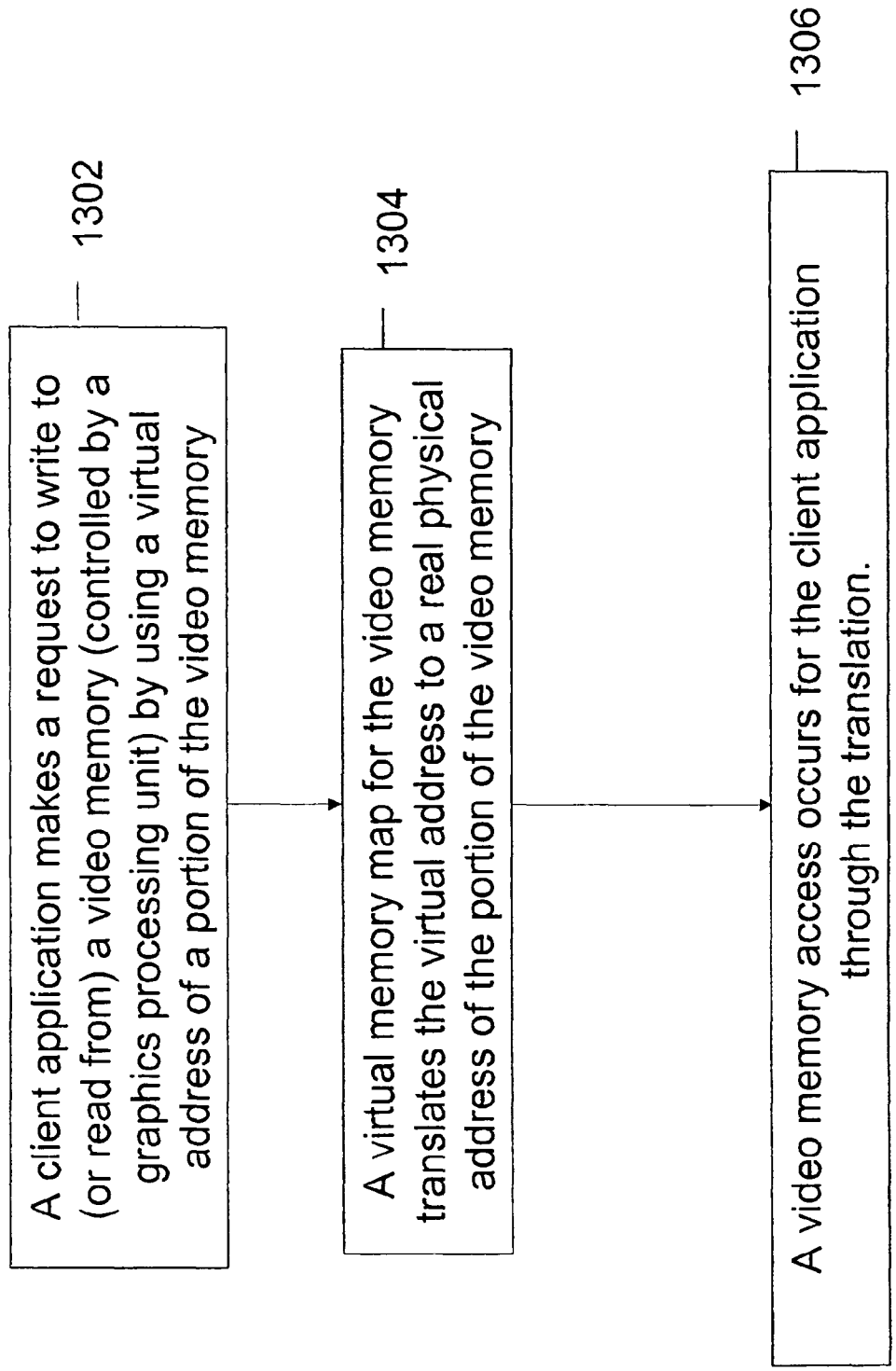
FIG. 13 is a process flow of a virtual address translation to provide access for a client application to a video memory, according to one exemplary embodiment.

FIG. 13 is a process flow of a virtual address translation to provide access for a client application to a video memory, according to one exemplary embodiment. In operation 1302, a client application (e.g., a client application having a client driver 103-109) makes a request to write to (or read from) video memory (controlled by a graphics processing unit) by using a virtual address of a portion of the video memory (e.g., VRAM 606). In operation 1304, a virtual memory map (e.g., a virtualization table 1000) for the video memory translates the virtual address to a real physical address of the portion of the video memory. In operation 1306, a video memory access (e.g., ability to read/write) occurs for the client application through the translation.

It will be appreciated that the system memory (e.g. memory 59 of FIG. 5B or memory 604 of FIG. 6A, both of which may be DRAM, such as DDR (Double Data Rate) random access memory) may be virtualized by a virtual memory System in addition to the virtualization of video memory (e.g. the virtualization of video memory shown in FIG. 13). Thus, one computer system, or other types of data processing systems, may have one or more virtual memory systems which virtualize both the system memory and the video memory. In certain embodiments, a first virtual memory system, controlled by software executing on a main microprocessor (e.g. CPU 602 of FIG. 6A), may provide the virtualization of the system memory, and a second virtual memory system, controlled by software executing on a graphics processor (e.g. graphics processor 607) and/or a main mircroporcessor, may provide the virtualization of the video memory. In both cases, the appropriate virtual memory system for the memory which is virtualized determines whether paging out to a backing store or paging in from the backing store is required. In the case of a virtual memory system for video memory, paging out of data from video memory to a backing store (e.g. to system memory or to mass storage such as a hard drive) is required when no or too little physical memory space is available in the video memory. Also in the case of a virtual memory system for video memory, paging in of data from the backing store to the video memory may be required when a process attempts to access the data while it is stored (or in the process of being stored) in the backing store. Some implementations may not perform paging in of data from the backing store (such as system memory) to the video memory (for example, the virtual address of the data is remapped to point to the data in the backing store rather than paging in of the data from the backing store to the video memory). In the case of a virtual memory system for system memory, paging out of data from the system memory to a backing store (e.g. to mass storage such as a hard drive) is required when too little physical memory space is available in the system memory. Also in the case of a virtual memory system for system memory, paging in of data from the backing store (e.g. a hard drive) is required when a process attempts to access data while it is stored (or in the process of being stored) in the backing store.

It will be understood that the process of paging in or paging out data requires that memory access (for the data) which occurs during the paging process (or when the data has been stored on the backing store) be blocked as described herein. For example, if an access, by a task, is attempted when the data sought in the access is stored in a backing store (e.g. hard drive), then a memory fault is generated and the data is copied from the backing store to the system memory (a paging in process) while the task's thread is blocked. The new physical pages are probably not the same pages in which the data was previously stored so the data is remapped so that the same virtual address, in the task's virtual address space, points to the new location, in physical system memory, of the data. When the copy and remapping are complete, the task's thread is unblocked (e.g. allowed to proceed). If an access, by a task, is attempted when the data is being paged out to a backing store, normally the paging out is allowed to finish and then the data is paged in from the backing store while the task's thread is blocked. If an access, by a task, is attempted when data is being paged in (from a backing store), then one thread has already attempted access when the data was in the backing store and that thread is blocked and has started the page in process and other threads attempting to access the data will also be blocked until the page in process is completed. A page out process for the video memory may block accesses to the data until the transfer to system memory is complete and then the access may be allowed to the data in the system memory rather than paging in the data back into the video memory; in this situation, the physical destination of the data is different from its previous location (having just moved from video memory to system memory) so the persistent virtual address of the data is remapped to point to the new storage location before allowing the thread to proceed. In an alternative embodiment, the page out process from video memory to system memory may be allowed to complete and then the data is paged back into the video memory while blocking the thread's access during both the page out and page in processes. Also in certain embodiments, a graphics driver architecture may not allow multi-threaded accesses to the blocks of memory that will utilize the virtual video memory, so an access to data by a thread which did not start a page in of the data to video memory will not be handled; of course, it is possible in this situation, that an application will attempt such an access, and terminating the application would be appropriate rather than hanging the operating system.

The regions of video memory being accessed are, in certain embodiments, physically contiguous, so virtual mapping applied to data in the video memory need not provide any scatter/gather functionality. The virtual memory system for the video memory has, in certain embodiments, the ability to create a virtual address range, at a specified address and of a specified size which is adjustable, in a task's virtual memory space that points to a contiguous range of physical video memory space (e.g. PCI memory space), rather than a fixed virtual address range for a task.

It will be appreciated that while FIGS. 6A-13 illustrate the processes of writing data into memory locations, the processes illustrated within the FIGS. 6A-13 may also equally apply to other operations (e.g., reading data, verifying data, organizing data, etc.) from memory locations and to verification of data within memory locations. It will be appreciated that the computer system 51 in FIG. 5B is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers or game players are other types of computer systems that can be used with the present invention. Network computers do not usually include a hard disk or other mass storage, and the executable programs are loaded from a network connection into the memory 59 for execution by the processor 55. Game players typically are special purpose computer systems. A TV browser system such as the Web TV system, which is known in the art, is also considered to be a computer system according to the present invention, but it may lack some of the features shown in FIG. 5B, such as certain input or output devices. A typical computer system will usually include at least a processor, memory, and a bus coupling the memory to the processor. In general, any data processing system may use one or more aspects of the inventions described herein. For example, any data processing system which includes a processor and system memory and a display or graphics memory may use one or more aspects of the inventions described herein.

It will also be appreciated that the computer system 51 is controlled by operating system software which includes a file management system, such as a disk operating system, which is part of the operating system software. One example of an operating system software with its associated file management system software is the family of operating systems known as Mac® OS from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Virtualization of graphics resources has been described. It will also be understood that the terms "page" or "page in" or "page out" refer to moving data, which may or may not be in fixed size blocks or "pages" of memory, rather than the movement of data in only fixed size blocks of data (such as a fixed size of 64 KB which is moved as a block). Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. The terminology used in this application with respect to graphics is meant to include all environments that display images to a user. Therefore, it is manifestly intended that this invention be limited only by the following claims and equivalents thereof.

What is claimed is:

1. A machine implemented method comprising:
generating a data structure having an identifier of a graphics resource assigned to a physical memory location in video memory; and
controlling access to the physical memory location in response to determining if a data within the physical memory location is in transition between video memory and system memory
wherein a client application accesses memory in the system memory at least in part through a first virtual memory map and
wherein the client application accesses memory in the video memory through a second virtual memory map at least when writing data from a processor, through a memory controller, to the video memory without writing the data to the system memory;
authorizing access to the physical memory location if the data within the physical memory location is not in transition;
selecting a bus from one of a system memory bus and a graphics controller bus based on an available performance of the system memory bus and an available performance of the graphics controller bus;
extracting the graphics resource from a system memory using the selected bus, and transmitting the graphics resource to a video memory.

2. The method of claim 1 wherein the first virtual memory map is an operating system virtualization of the system memory and wherein the data is in transition either when being paged out or paged into video memory.

3. The method of claim 1, further comprising assembling the graphics resource into at least one buffer in a system memory, and transmitting the graphics resource to a video memory using the at least one buffer.

4. The method of claim 1, further comprising receiving a request for the graphics resource from a client driver unaware of the physical memory location for the graphics resource.

5. The method of claim 1, wherein the physical memory location exists within at least one of a video memory, a system dynamic random access memory, and at least one storage device.

6. The method of claim 1, further comprising:
receiving an allocation request of the graphics resource from a graphics client;
assigning a token to represent the graphics resource;
returning the token to the graphics client;
receiving a tokenized command from the graphics client, the tokenized command containing a token; and
replacing the token in the tokenized command with an address for the physical memory location, wherein the data within the physical memory location includes the graphics resource.

7. The method of claim 6, further comprising locating the tokenized command in a command stream using an offset specified in a jump packet within the command stream.

8. The machine implemented method of claim 1, further comprising:
determining if the performance of the graphics controller bus is superior to the performance of the system memory bus, wherein the graphics controller bus and the system memory bus are both available at runtime.

9. A machine-readable non-transitory storage medium storing instructions to cause a machine to perform a machine-implemented method comprising:
generating a data structure having an identifier of a graphics resource assigned to a physical memory location in video memory; and
controlling access to the physical memory location in response to determining if a data within the physical memory location is in transition between video memory and system memory
wherein a client application accesses memory in the system memory at least in part through a first virtual memory map and
wherein the client application accesses memory in the video memory through a second virtual memory map at least when writing data from a processor, through a memory controller, to the video memory without writing the data to the system memory;
authorizing access to the physical memory location if the data within the physical memory location is not in transition;
selecting a bus from one of a system memory bus and a graphics controller bus based on an available performance of the system memory bus and an available performance of the graphics controller bus;
extracting the graphics resource from a system memory using the selected bus and transmitting the graphics resource to a video memory.

10. The machine readable non-transitory storage medium of claim 9, the method further comprising:
determining if the performance of the graphics controller bus is superior to the performance of the system memory bus, wherein the graphics controller bus and the system memory bus are both available at runtime.

11. An apparatus, comprising:
means for generating a data structure having an identifier of a graphics resource assigned to a physical memory location in video memory; and
means for controlling access to the physical memory location in response to determining if a data within the physical memory location is in transition between video memory and system memory wherein a client application accesses memory in the system memory at least in part through a first virtual memory map and wherein the client application accesses memory in the video memory through a second virtual memory map at least when writing data from a processor, through a memory controller, to the video memory without writing the data to the system memory;

means for authorizing access to the physical memory location if the data within the physical memory location is not in transition;

means for selecting a bus from one of a system memory bus and a graphics controller bus based on an available performance of the system memory bus and an available performance of the graphics controller bus;

means for extracting the graphics resource from a system memory using the selected bus and transmitting the graphics resource to a video memory.

12. The apparatus of claim 11, further comprising:

means for determining if the performance of the graphics controller bus is superior to the performance of the system memory bus, wherein the graphics controller bus and the system memory bus are both available at runtime.

13. A system, comprising:

a virtualization module to assign identifiers associated with a set of resources to physical memory locations of a video memory, and to optimize operations of a computing environment using:

a memory controller;

a system memory bus that connects the memory controller to the system memory;

a graphics controller bus that connects the memory controller to the video memory;

a fast-write interface to extract a first resource of the set of resources from a system memory through a single operation, and to transmit the first resource to the video memory, a command buffer interface to assemble at least a second resource of the set of resources from the system memory into at least one buffer in the system memory, and to transmit at least the second resource to the video memory using the at least one buffer;

an interface selection module to select from one of the fast-write interface and the command buffer interface based on an available performance of the fast-write interface and an available performance of the command buffer interface;

a thread block module to block at least certain ones of the physical memory locations having data that is in transition to or from another physical memory location, wherein the thread block module to authorize access to other ones of the physical memory locations having data that is not in transition.

14. The system of claim 13, further comprising:

a performance determining module to determine if the performance of the graphics controller bus is superior to the performance of the system memory bus, wherein the graphics controller bus and the system memory bus are both available at runtime.

* * * * *

UNITED STATES PATENT AND TRADEMARK OFFICE
CERTIFICATE OF CORRECTION

| | | |
|---|---|---|
| PATENT NO. | : 7,768,522 B2 | Page 1 of 1 |
| APPLICATION NO. | : 11/112563 | |
| DATED | : August 3, 2010 | |
| INVENTOR(S) | : John Stauffer et al. | |

It is certified that error appears in the above-identified patent and that said Letters Patent is hereby corrected as shown below:

In column 4, line 21, delete "into a system" and insert -- into system --, therefor.

In column 7, line 53, delete "313 s" and insert -- 313 is --, therefor.

In column 17, line 49, delete "1004 ," and insert -- 1004, --, therefor.

In column 17, line 57, delete "802 's" and insert -- 802's --, therefor.

In column 19, line 23, delete "mircroporcessor," and insert -- microprocessor, --, therefor.

Signed and Sealed this
Eighth Day of November, 2011

David J. Kappos
*Director of the United States Patent and Trademark Office*